United States Patent
Yu

(10) Patent No.: US 8,432,824 B2
(45) Date of Patent: Apr. 30, 2013

(54) METHOD AND APPARATUS FOR SELECTING A RECEIVING APPARATUS FOR CO-CHANNEL OPERATION

(75) Inventor: Zhi-Zhong Yu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 377 days.

(21) Appl. No.: 12/769,778

(22) Filed: Apr. 29, 2010

(65) Prior Publication Data
US 2010/0322092 A1 Dec. 23, 2010

Related U.S. Application Data

(60) Provisional application No. 61/174,801, filed on May 1, 2009.

(51) Int. Cl.
*H04L 12/26* (2006.01)
*H04W 4/00* (2009.01)

(52) U.S. Cl.
USPC .......................................... 370/252; 370/328

(58) Field of Classification Search .................. None
See application file for complete search history.

(56) References Cited

U.S. PATENT DOCUMENTS

| | | | |
|---|---|---|---|
| 2009/0190548 A1* | 7/2009 | Niemela | 370/330 |
| 2009/0279587 A1* | 11/2009 | Eriksson et al. | 375/133 |
| 2010/0067440 A1* | 3/2010 | Dick et al. | 370/328 |
| 2010/0302990 A1* | 12/2010 | Lopez et al. | 370/312 |
| 2011/0077017 A1* | 3/2011 | Yu et al. | 455/452.1 |

FOREIGN PATENT DOCUMENTS
WO WO2009036389 3/2009

OTHER PUBLICATIONS

International Search Report and Written Opinion—PCT/US2010/033160, International Search Authority—European Patent Office—Aug. 30, 2010.

* cited by examiner

*Primary Examiner* — Marcus R Smith
(74) *Attorney, Agent, or Firm* — James Hunt Yancey, Jr.; Qualcomm Patent Group

(57) ABSTRACT

A method of selecting a receiving apparatus for co-channel operation, the method comprising: transmitting a first and a second data at predetermined respective power levels on a single first channel comprising a single frequency and time slot; receiving the data; measuring a characteristic of the data; transmitting a signal indicating the measured characteristic; receiving the indicating signal; and responding to the received indicating signal by selecting the receiving apparatus for co-channel operation depending on the measured characteristic.

64 Claims, 20 Drawing Sheets

METHOD AND APPARATUS FOR SELECTING A RECEIVING APPARATUS FOR CO-CHANNEL OPERATION

CLAIM OF PRIORITY UNDER 35 U.S.C. §119

The present application for patent claims priority to Provisional Application No. 61/174,801 entitled "A Method and Apparatus For Selecting A Receiving Apparatus For Co-Channel Operation" filed May 2, 2009, and assigned to the assignee hereof and hereby expressly incorporated by reference herein.

FIELD OF THE INVENTION

The invention relates generally to the field of digital communications and in particular to the selecting of a receiving apparatus for co-channel operation in a radio communications system.

BACKGROUND

Modern mobile cellular telephones are able to provide conventional voice calls and data calls. The demand for both types of calls continues to increase, placing increasing demands on network capacity. Network operators address this demand by increasing their capacity. This is achieved, for example, by dividing or adding cells and hence adding more base stations, which increases hardware costs. It is desirable to increase network capacity without unduly increasing hardware costs, in particular to cope with unusually large peak demand during major events such as an international football match or a major festival, in which many users or subscribers who are located within a small area wish to access the network at one time.

When a first remote station is allocated a channel for communication, a second remote station can only use the allocated channel after the first remote station has finished using the channel. Maximum cell capacity is reached when all the allocated channels are used in the cell. This means that any additional remote station user will not be able to get service. Co-channel interference (CCI) and adjacent channel interference (ACI) further limit network capacity and will be discussed below.

Network operators have addressed this problem in a number of ways, all of which require added resources and added cost. For example, one approach is to divide cells into sectors by using sectored, or directional, antenna arrays. Each sector can provide communications for a subset of remote stations within the cell and the interference between remote stations in different sectors is less than if the cell were not divided into sectors. Another approach is to divide cells into smaller cells, each new smaller cell having a base station. Both these approaches are expensive to implement due to added network equipment. In addition, adding cells or dividing cells into smaller cells can result in remote stations within one cell experiencing more CCI and ACI interference from neighboring cells because the distance between cells is reduced.

SUMMARY OF THE INVENTION

The claimed invention is defined by the appended claims comprising: the apparatus as claimed in claim 1 and its dependant claims; the method as claimed in claim 14 and its dependant claims; the apparatus as claimed in claim 27 and its dependant claims, the apparatus as claimed in claim 39 and its dependant claims, and the computer program product as claimed in claim 52 and its dependant claims.

The above and further features of the invention are set forthwith particularity in the appended claims and together with advantages thereof will become clearer from consideration of the following detailed description of embodiments of the invention. Various changes and modifications within the spirit and scope of the invention will become apparent to those skilled in the art. The embodiments are described with reference to the accompanying drawings wherein:

Figure 8:
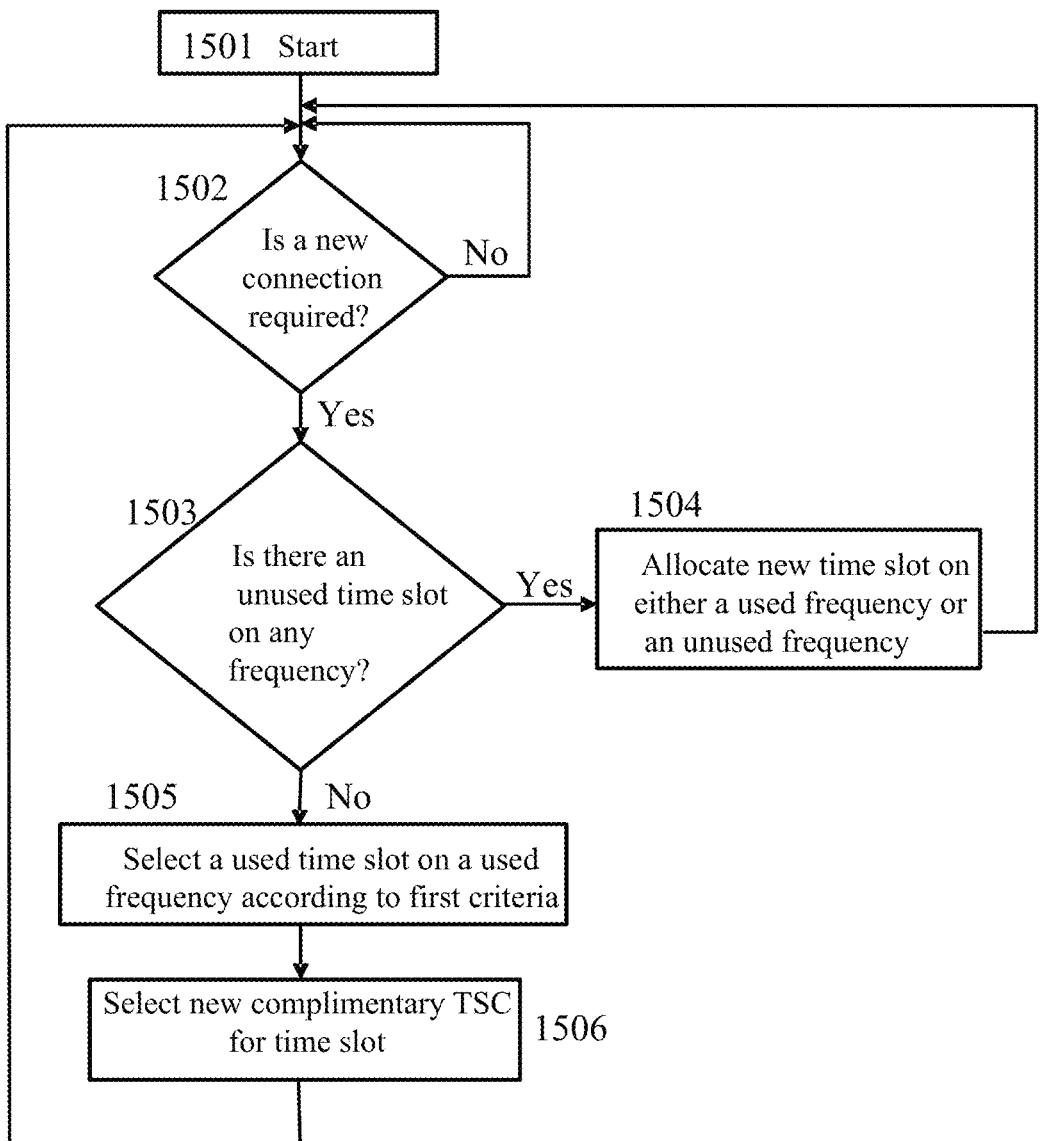
FIG. 8 shows a flowchart of a method of assigning a channel already in use by one remote station to another remote station.
Figure 9:
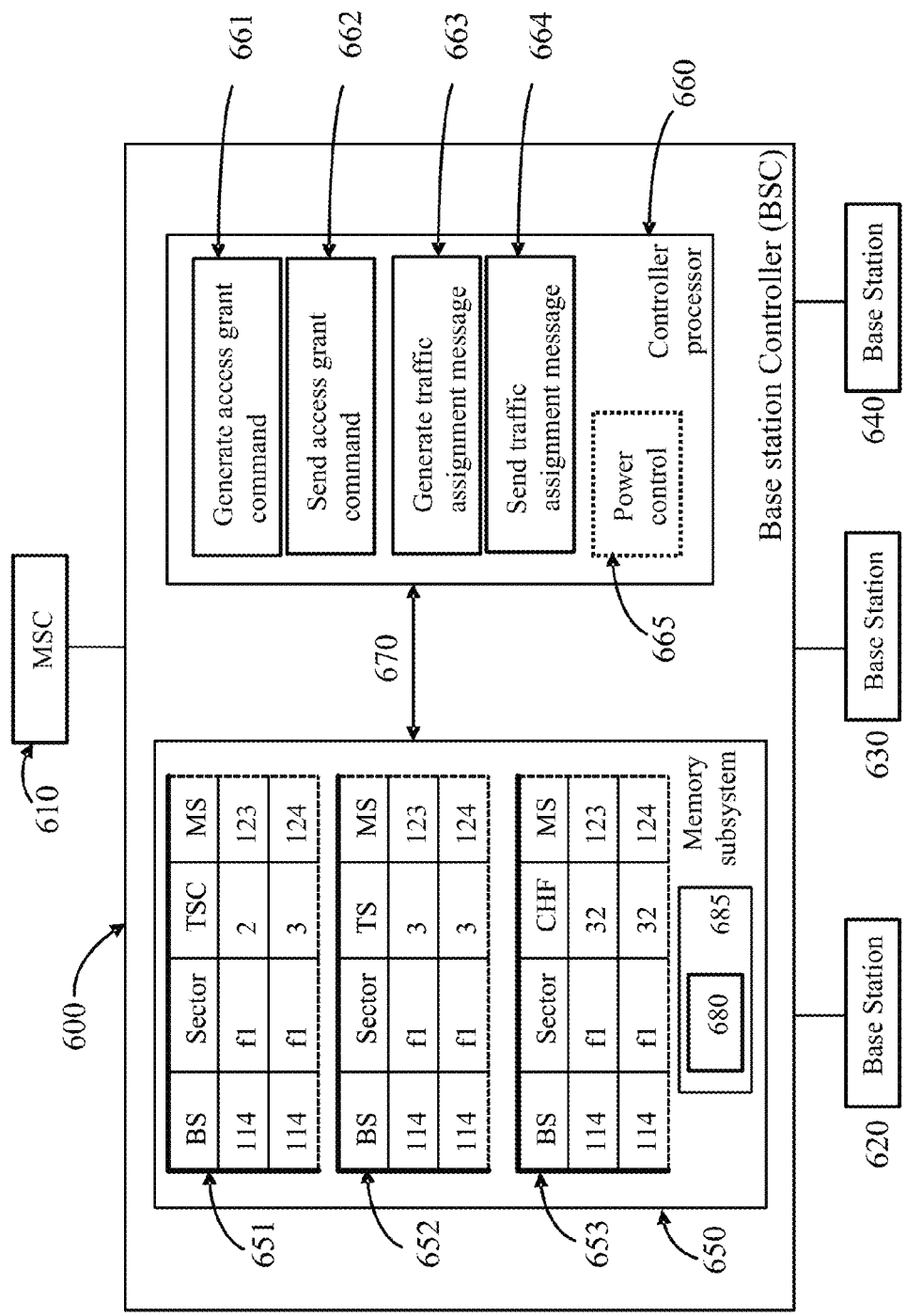
Figure 10:
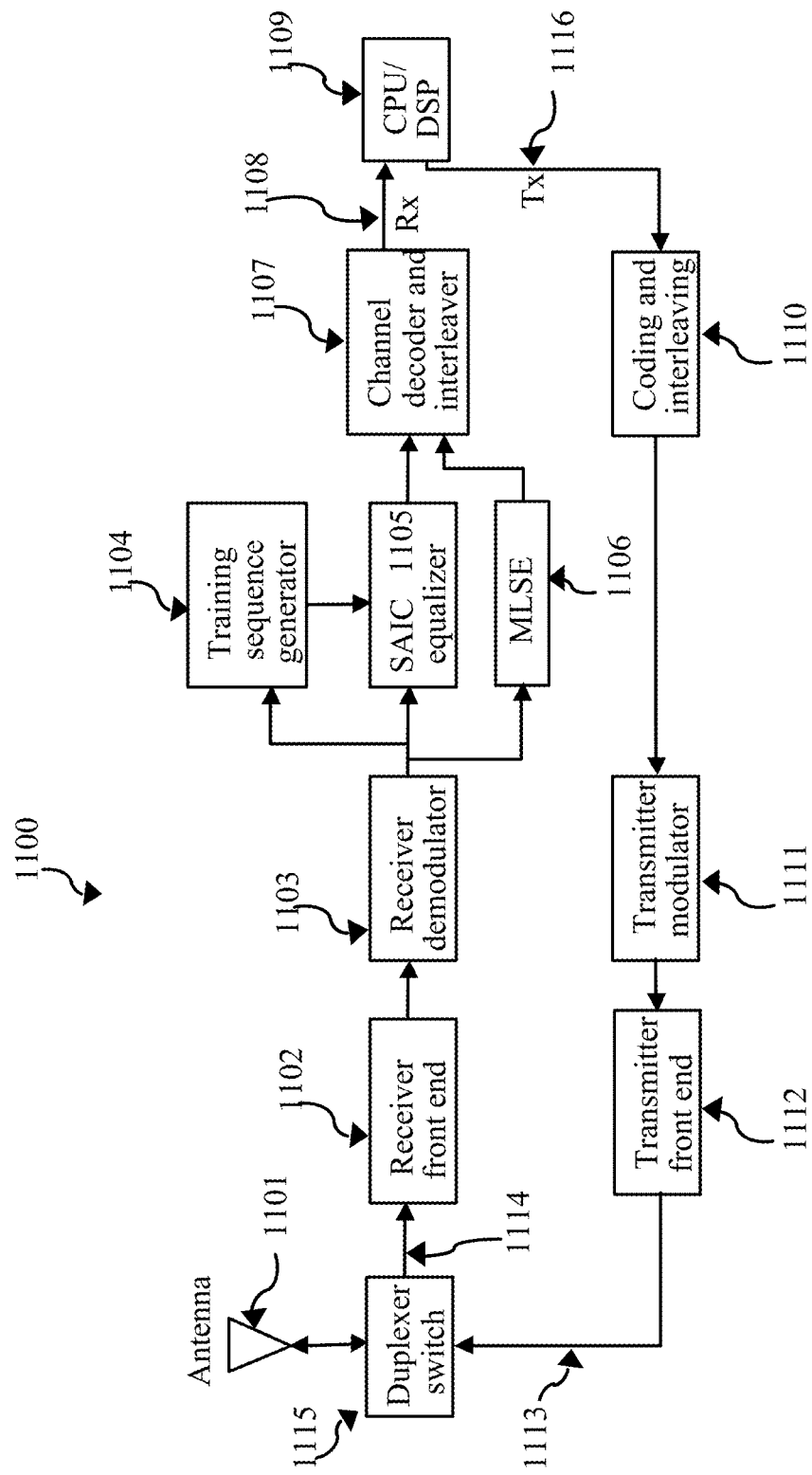
Figure 11A:
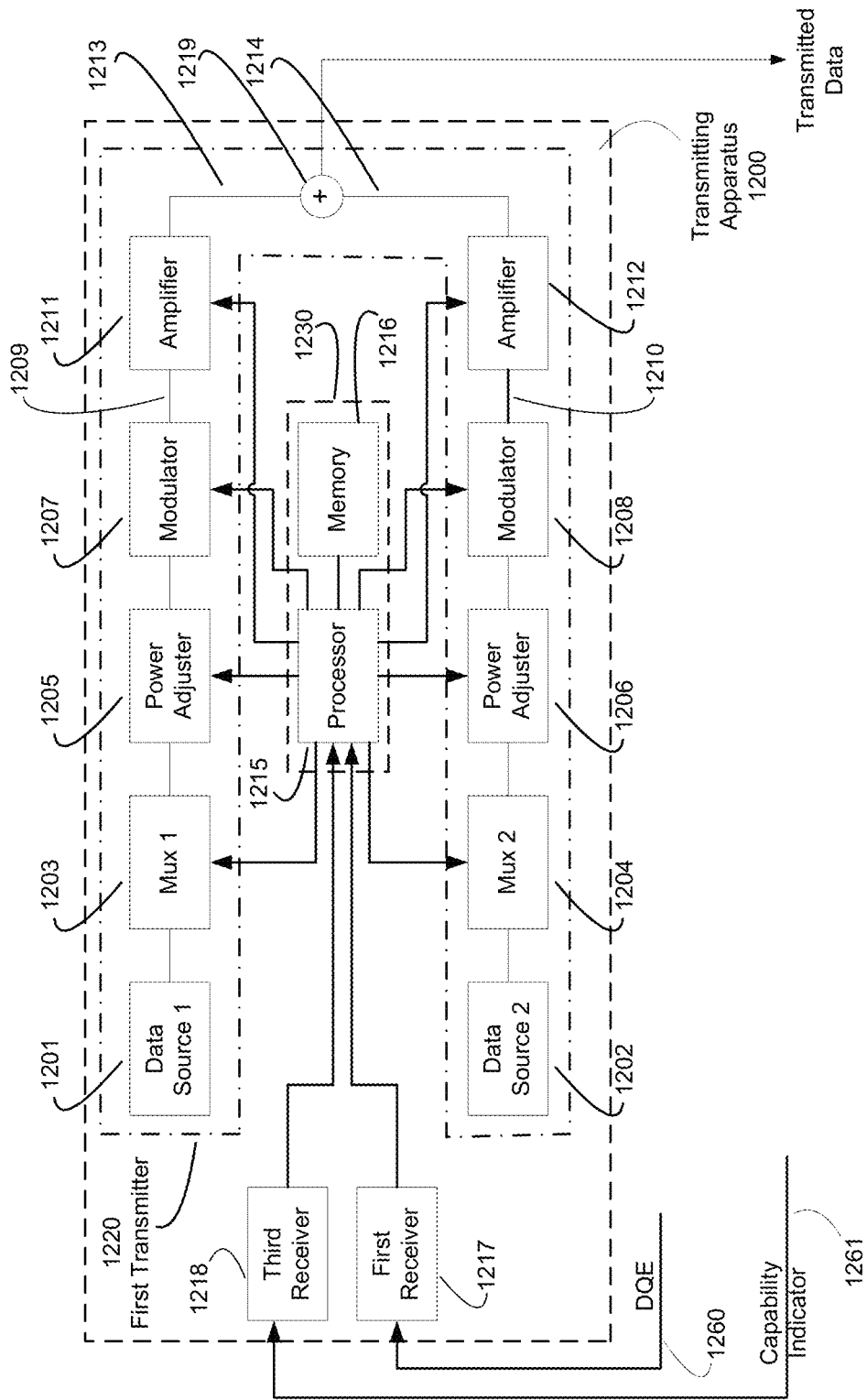
Figure 11B:
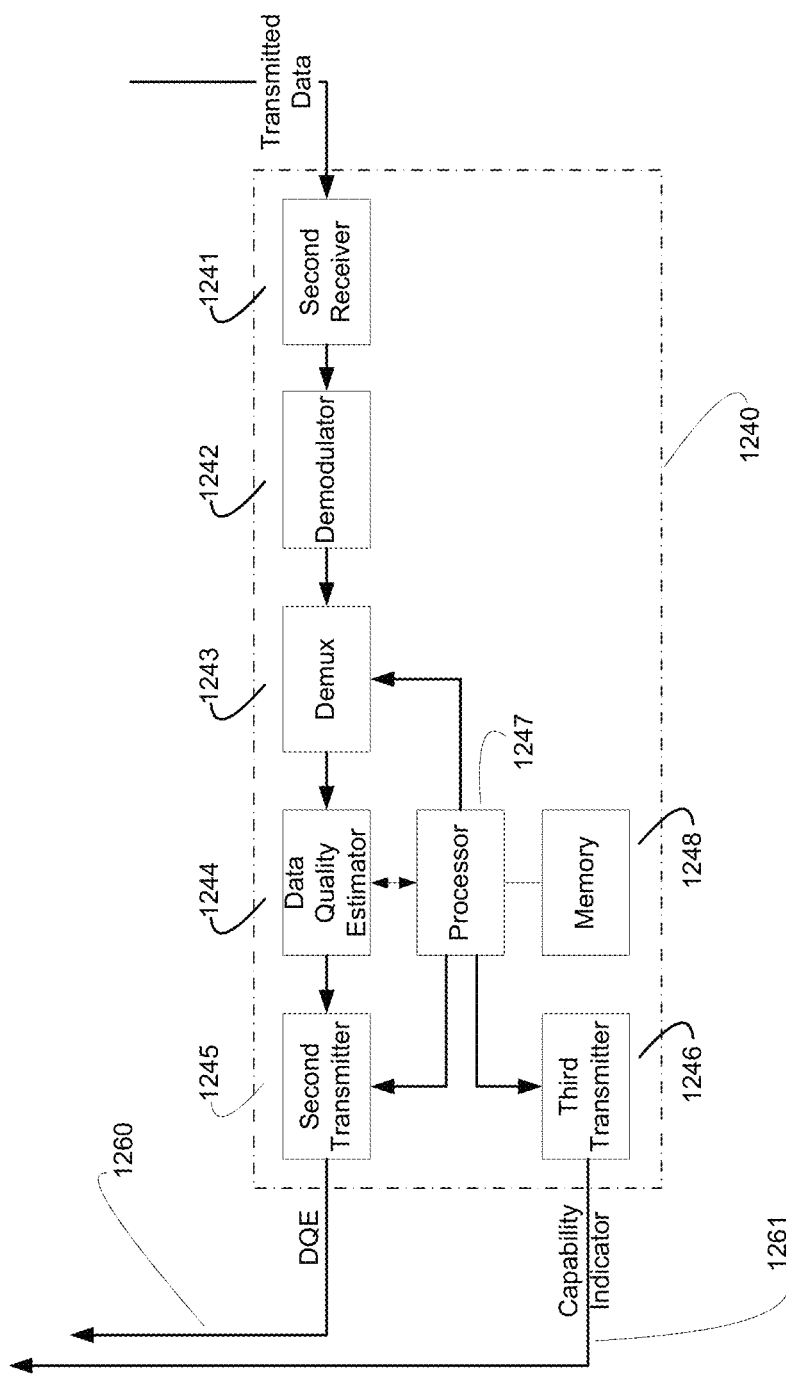
Figure 12A:
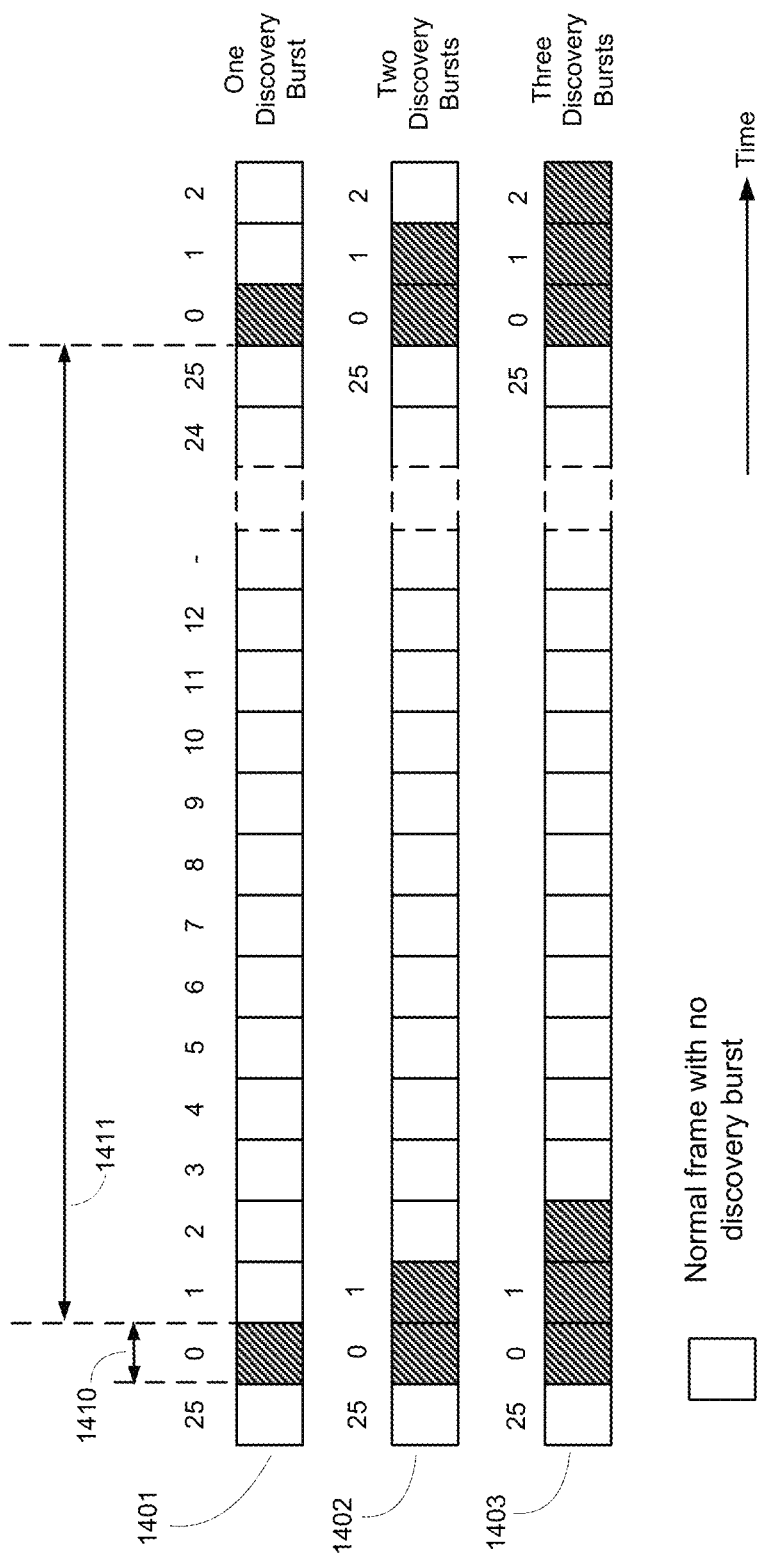
Figure 12B:
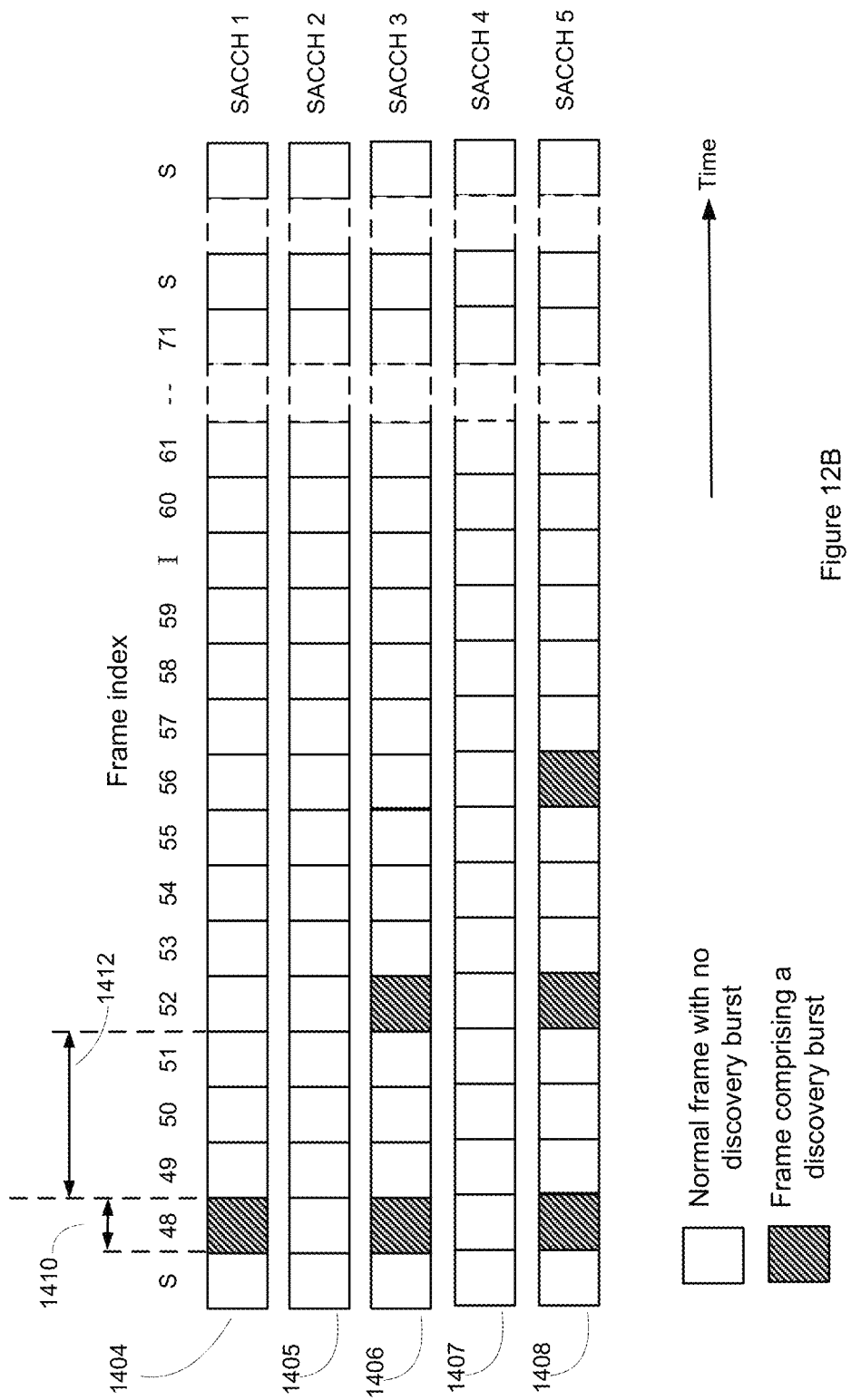

FIG. 9 of the accompanying drawings is a schematic diagram of apparatus wherein the method represented by FIG. 8 resides in a base station controller;

FIG. 10 shows a receiver architecture for a remote station having enhanced co-channel rejection capability;

FIG. 11 is a schematic diagram of (a) a transmitting apparatus and (b) a receiving apparatus, suitable for selecting a receiving apparatus for co-channel operation;

FIG. 12A is a schematic diagram showing sequences of data frames each containing, or not containing, discovery bursts comprising co-channel data;

FIG. 12B is a further schematic diagram showing sequences of data frames each containing, or not containing, discovery bursts comprising co-channel data.

Figure 13:
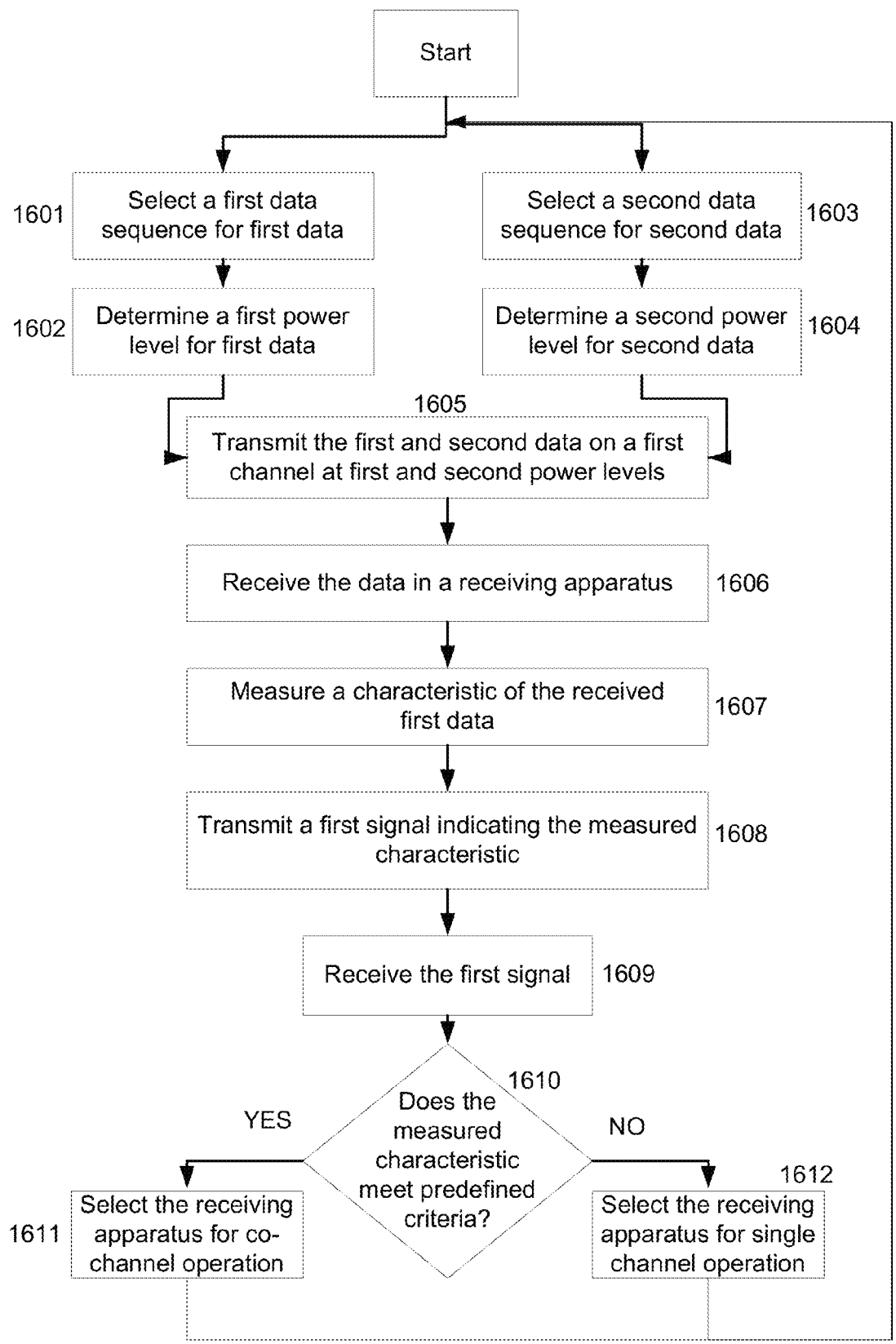
Figure 14:
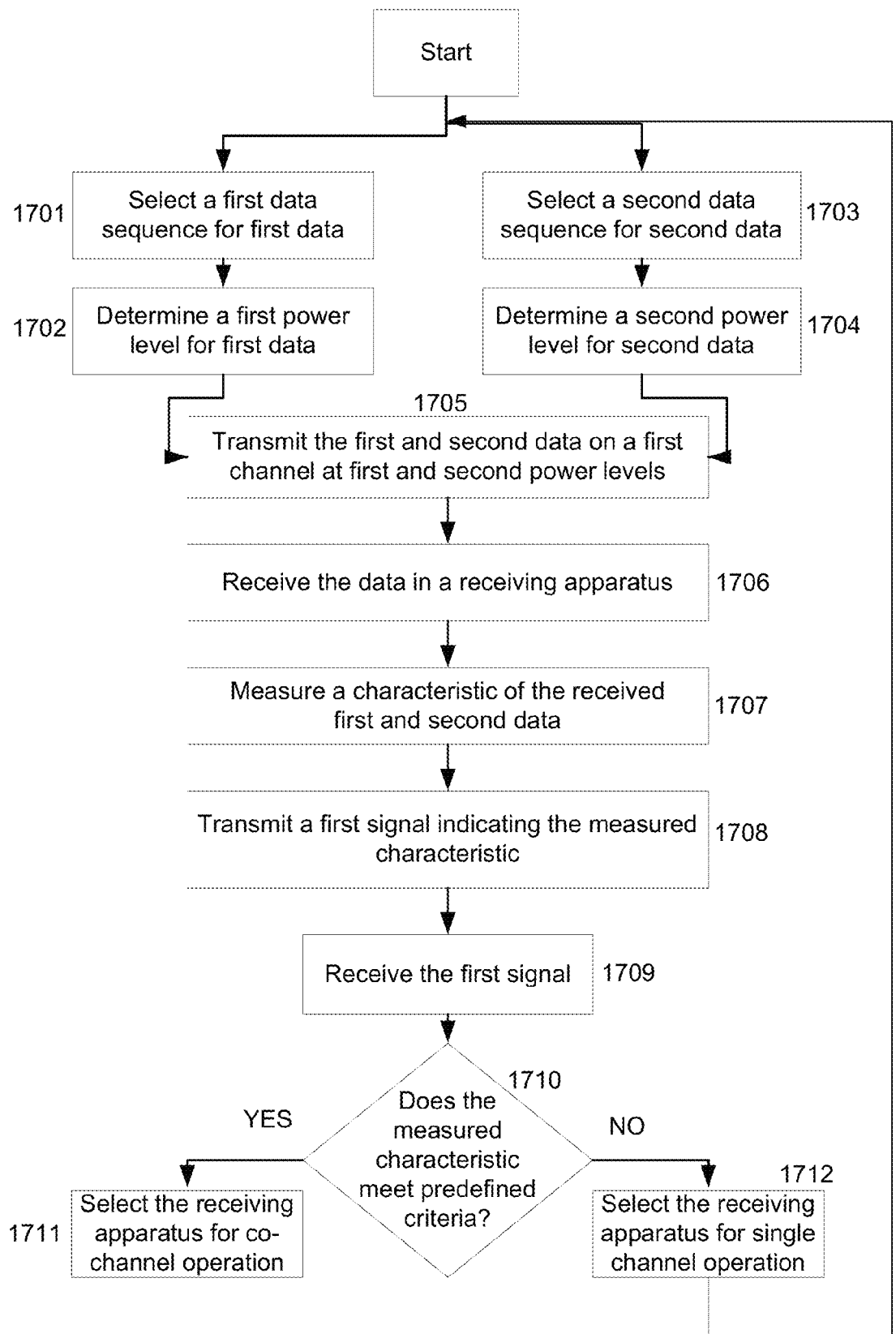
Figure 15:
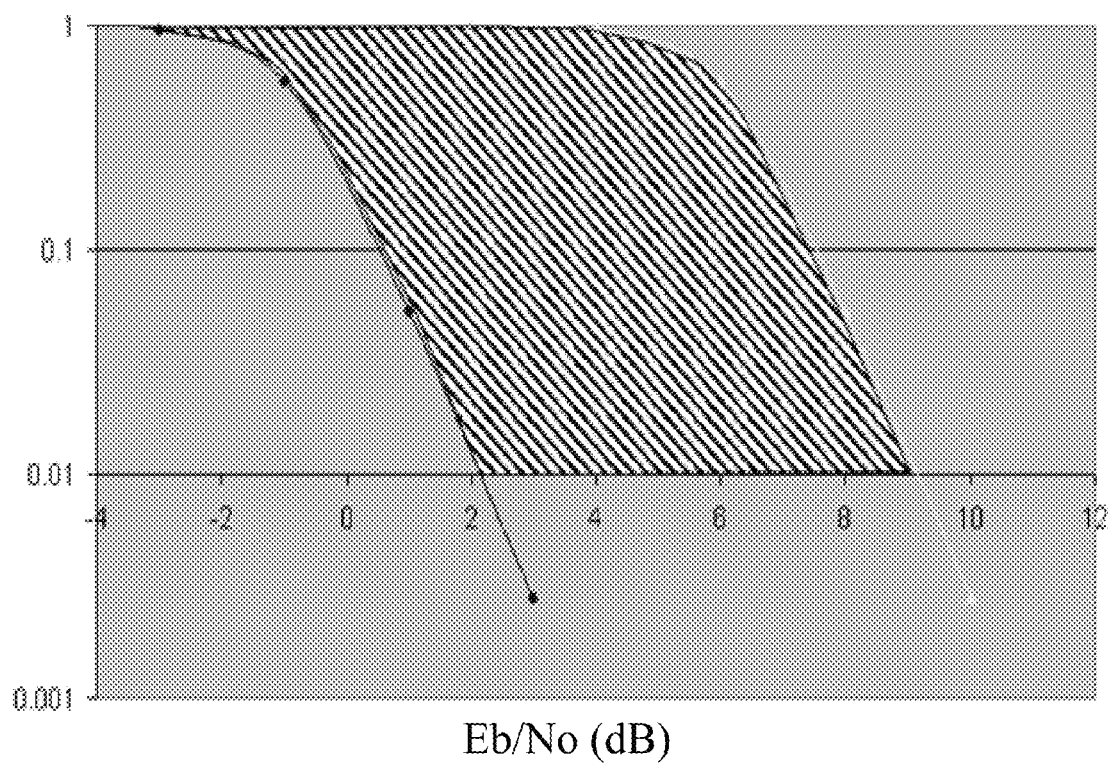
Figure 16:
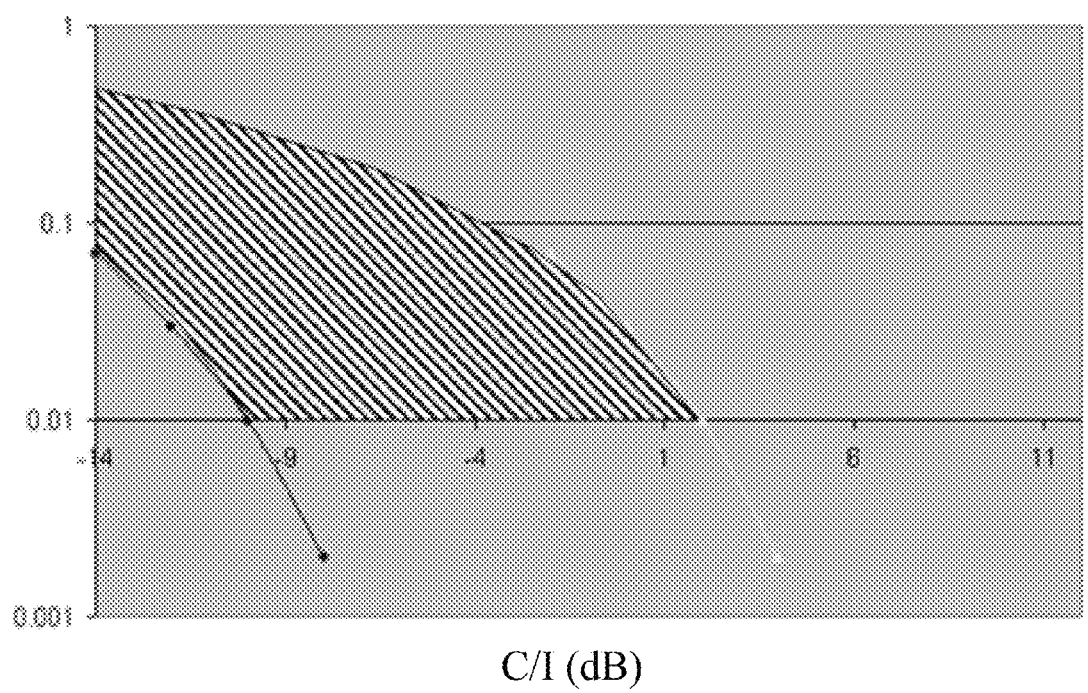

FIG. 13 is a flow diagram of a method of selecting a receiving apparatus for co-channel operation;

FIG. 14 is a further flow diagram of a method of selecting a receiving apparatus for co-channel operation;

FIG. 15 is a graph of FER performance under different levels of signal-to-noise ratio (Eb/No) for different codecs;

FIG. 16 is a graph of FER performance under different levels of carrier to interference (C/I) for different codecs.

Figure 17:
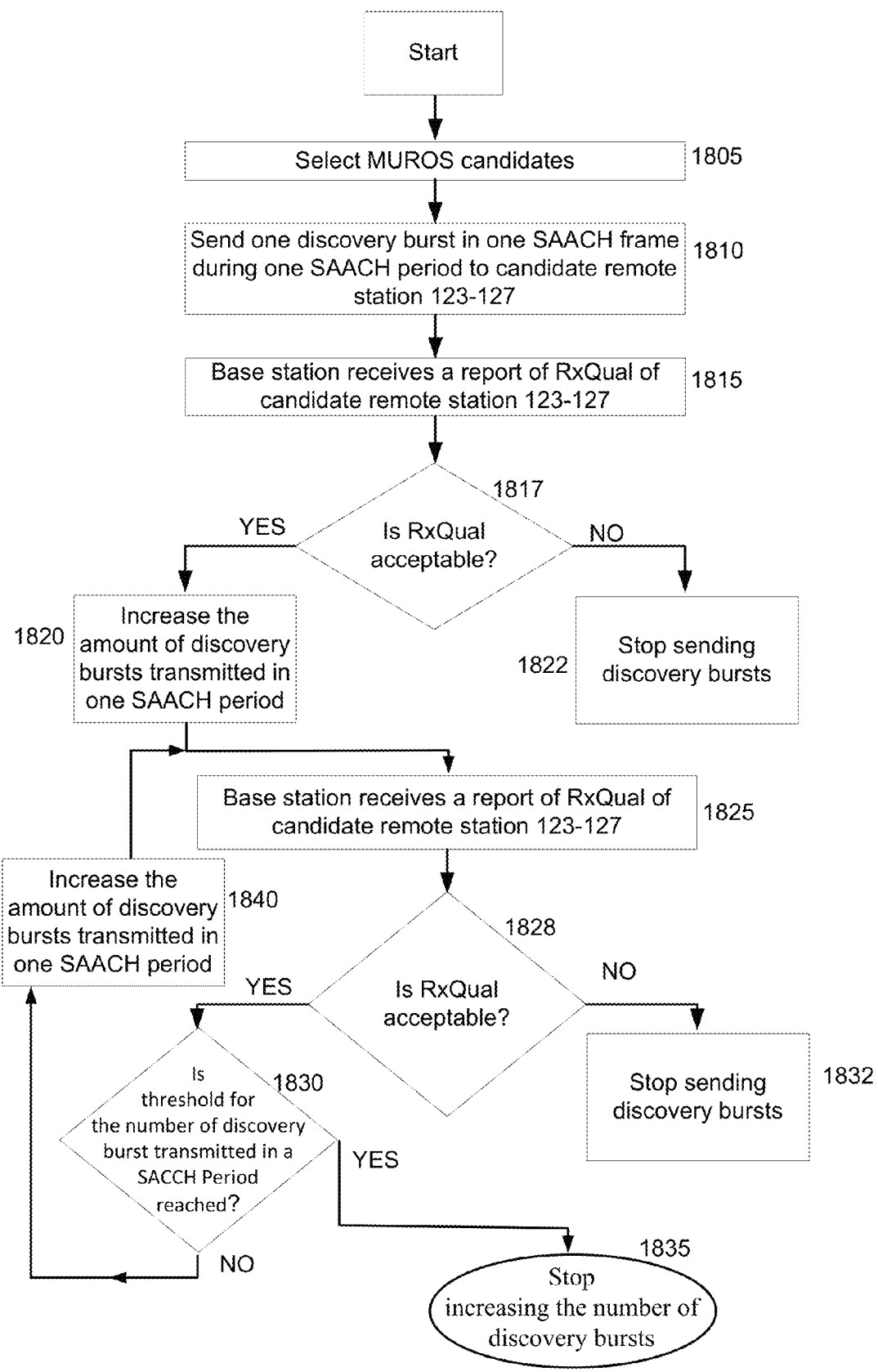

FIG. 17 is a flow diagram of a method of progressively increasing the number of discovery bursts within a SACCH period for a series of SACCH periods.

Figure 18:
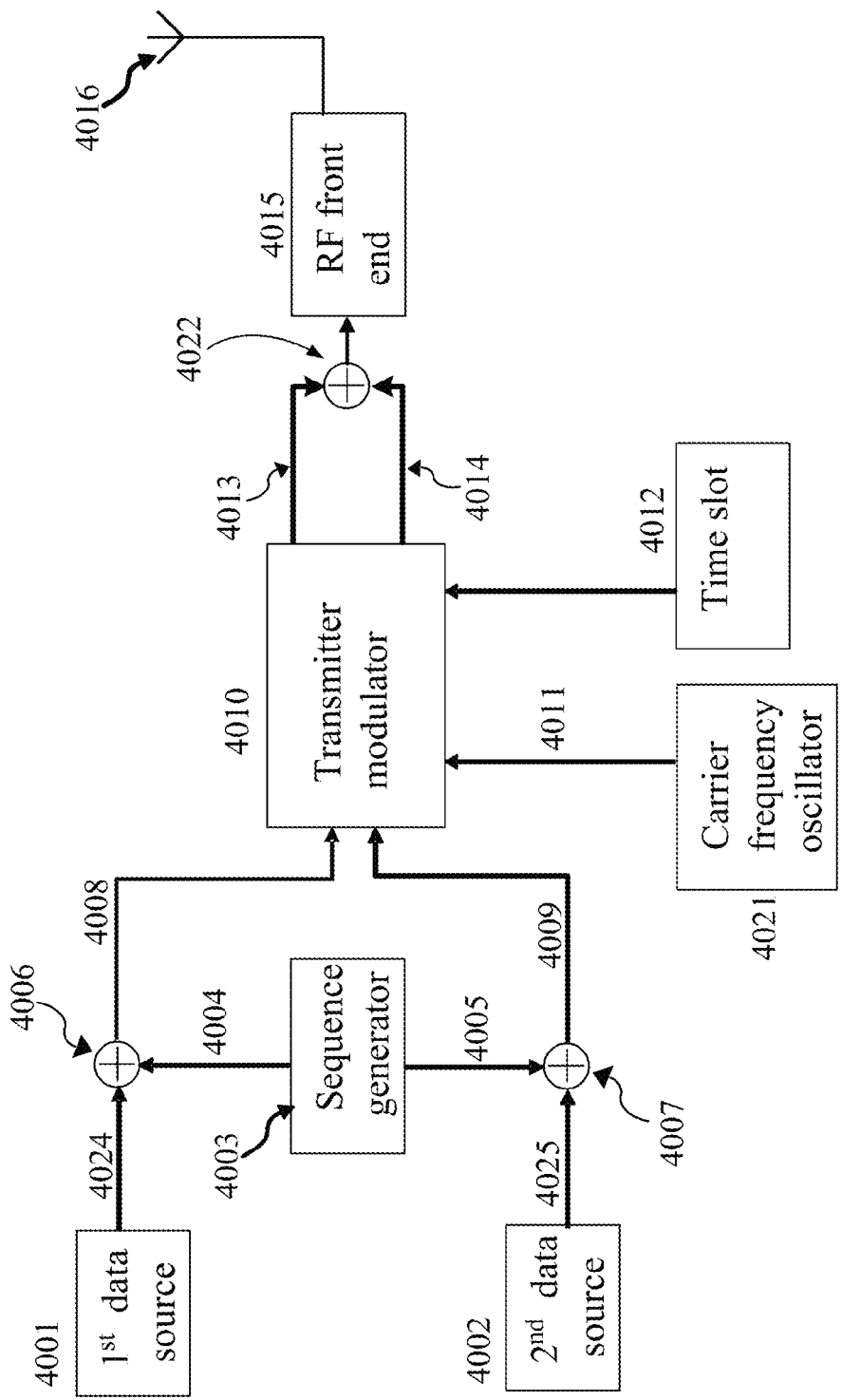

FIG. 18 of the accompanying drawings shows an apparatus for operating in a multiple access communication system to produce first and second signals sharing a single channel.

DETAILED DESCRIPTION

Interference due to other users limits the performance of wireless networks. This interference can take the form of either interference from neighboring cells on the same frequency, known as co-channel interference (CCI), discussed above, or neighboring frequencies on the same cell, known as adjacent channel interference (ACI), also discussed above.

Figure 1:
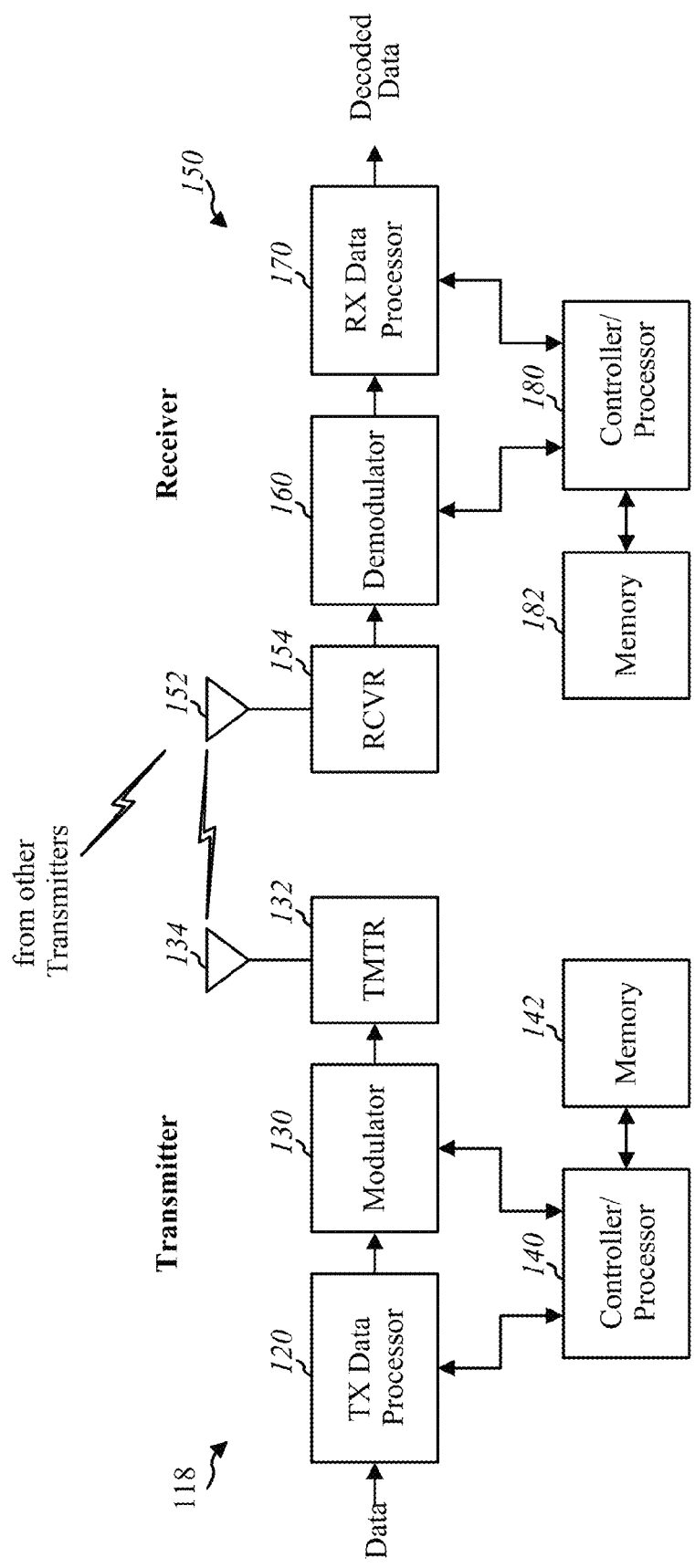
FIG. 1 shows a block diagram of a transmitter and a receiver.

FIG. 1 of the accompanying drawings shows a block diagram of a transmitter 118 and a receiver 150 in a wireless communication system. For the downlink, the transmitter 118 may be part of a base station, and receiver 150 may be part of a wireless device (remote station). For the uplink, the transmitter 118 may be part of a wireless device such as a remote station, and receiver 150 may be part of a base station. A base station is generally a fixed station that communicates with the wireless devices and may also be referred to as a Node B, an evolved Node B (eNode B), an access point, etc. A wireless device may be stationary or mobile and may also be referred to as a remote station, a mobile station, a user equipment, a mobile equipment, a terminal, a remote station, an access terminal, a station, etc. A wireless device may be a cellular phone, a personal digital assistant (PDA), a wireless modem, a wireless communication device, a handheld device, a subscriber unit, a laptop computer, etc.

At transmitter 118, a transmit (TX) data processor 120 receives and processes (e.g., formats, encodes, and interleaves) data and provides coded data. A modulator 130 performs modulation on the coded data and provides a modulated signal. A transmitter unit (TMTR) 132 conditions (e.g., filters, amplifies, and upconverts) the modulated signal and generates an RF modulated signal, which is transmitted via an antenna 134.

At receiver 150, an antenna 152 receives the transmitted RF modulated signal from transmitter 110 together with transmitted RF modulated signals from other transmitters. Antenna 152 provides a received RF signal to a receiver unit (RCVR) 154. Receiver unit 154 conditions (e.g., filters, amplifies, and downconverts) the received RF signal, digitizes the conditioned signal, and provides samples. A demodulator 160 processes the samples and provides demodulated data. A receive (RX) data processor 170 processes (e.g., deinterleaves and decodes) the demodulated data and provides decoded data. In general, the processing by demodulator 160 and RX data processor 170 is complementary to the processing by modulator 130 and TX data processor 120, respectively, at transmitter 110.

In a wireless communications system, the data is multiplexed using a multiplexing technique, so as to allow a plurality of remote stations 123-127 (each comprising a receiver 150) to communicate with a single base station 110, 111, 114 (comprising a transmitter 118). Examples of multiplexing techniques are frequency division multiplex (FDM), and time division multiplexing (TDM) or time division multiple access (TDMA). The concepts underlying these techniques will be discussed below.

Controllers/processors 140 and 180 control/direct operations at transmitter 118 and receiver 150, respectively. Memories 142 and 182 store program codes in the form of computer software, and data used by transmitter 118 and receiver 150 respectively.

Figure 2:
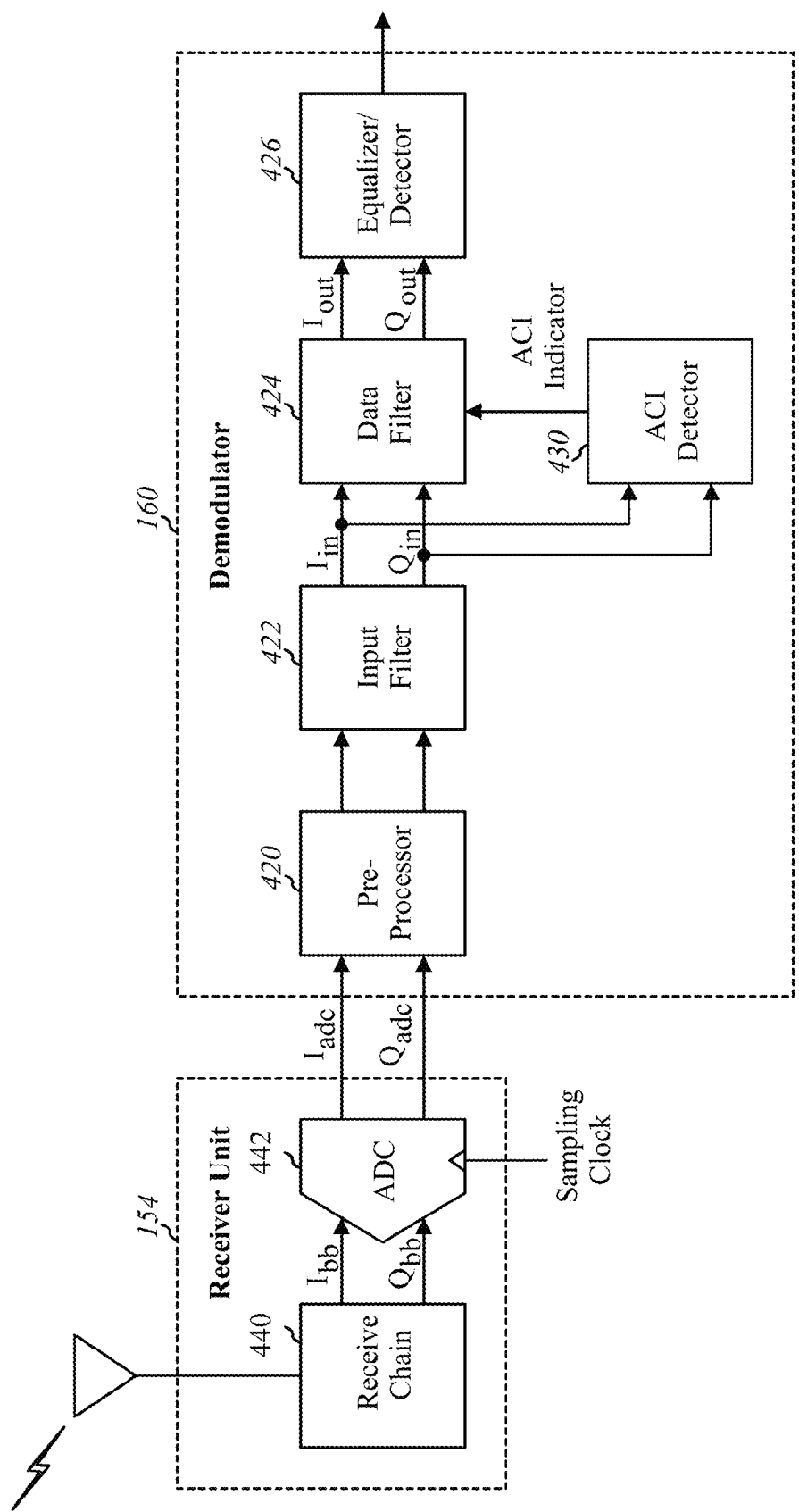
FIG. 2 shows a block diagram of a receiver unit and demodulator of the receiver shown in FIG. 1.

FIG. 2 of the accompanying drawings shows a block diagram of a receiver unit 154 and demodulator 160 of the receiver 150 shown in FIG. 1. Within receiver unit 154, a receive chain 440 processes the received RF signal and provides I and Q baseband signals, which are denoted as $I_{bb}$ and $Q_{bb}$. Receive chain 440 may perform low noise amplification, analog filtering, quadrature downconversion, etc. An analog-to-digital converter (ADC) 442 digitalizes the I and Q baseband signals at a sampling rate of $f_{adc}$ and provides I and Q samples, which are denoted as $I_{adc}$ and $Q_{adc}$. In general, the ADC sampling rate $f_{ads}$ may be related to the symbol rate $f_{sym}$ by any integer or non-integer factor.

Within demodulator 160, a pre-processor 420 performs pre-processing on the I and Q samples from ADC 442. For example, pre-processor 420 may remove direct current (DC) offset, remove frequency offset, apply automatic gain control (AGC) etc. An input filter 422 filters the samples from pre-processor 420 based on a particular frequency response and provides input I and Q samples, which are denoted as $I_{in}$ and $Q_{in}$ to data filter 422. Data filter 422 may filter the I and Q samples to suppress images resulting from the sampling by ADC 442 as well as jammers. Filter 422 may also perform sample rate conversion, e.g., from 24× oversampling down to 2× oversampling. A data filter 424 filters the input I and Q samples from input filter 422 based on another frequency response and provides output I and Q samples, which are denoted as $I_{out}$ and $Q_{out}$. Filters 422 and 424 may be implemented with finite impulse response (FIR) filters, infinite impulse response (IIR) filters, or filters of other types. The frequency responses of filters 422 and 424 may be selected to achieve good performance. In one example, the frequency response of filter 422 is fixed, and the frequency response of filter 424 is configurable.

An adjacent channel interference (ACI) detector 430 receives the input I and Q samples from filter 422, detects for ACI in the received RF signal, and provides an ACI indicator signal to filter 424. The ACI indicator signal may indicate whether or not ACI is present and, if present, whether the ACI is due to the higher RF channel centered at +200 KHz and/or the lower RF channel centered at −200 KHz. The frequency response of filter 424 may be adjusted based on the ACI indicator to achieve good performance.

An equalizer/detector 426 receives the output I and Q samples from filter 424 and performs equalization, matched filtering, detection, and/or other processing on the samples. For example, equalizer/detector 426 may implement a maximum likelihood sequence estimator (MLSE) that determines a sequence of symbols that is most likely to have been transmitted given a sequence of I and Q samples and a channel estimate.

In a TDMA system, each base station 110, 111, 114 is assigned one or more channel frequencies and each channel frequency may be used by different users during different intervals of time known as time slots. For example each carrier frequency is assigned eight time slots (which are labeled as time slots 0 through 7) such that eight consecutive time slots form one TDMA frame. A physical channel comprises one channel frequency and one time slot within a TDMA frame. Each active wireless device/user is assigned one or more time slot indices for the duration of a call. For example during a voice call, a user is allocated one time slot (hence one channel) at any instant. User-specific data for each wireless device is sent in the time slot(s) assigned to that wireless device and in TDMA data frames used for the traffic channels.

Figure 3:
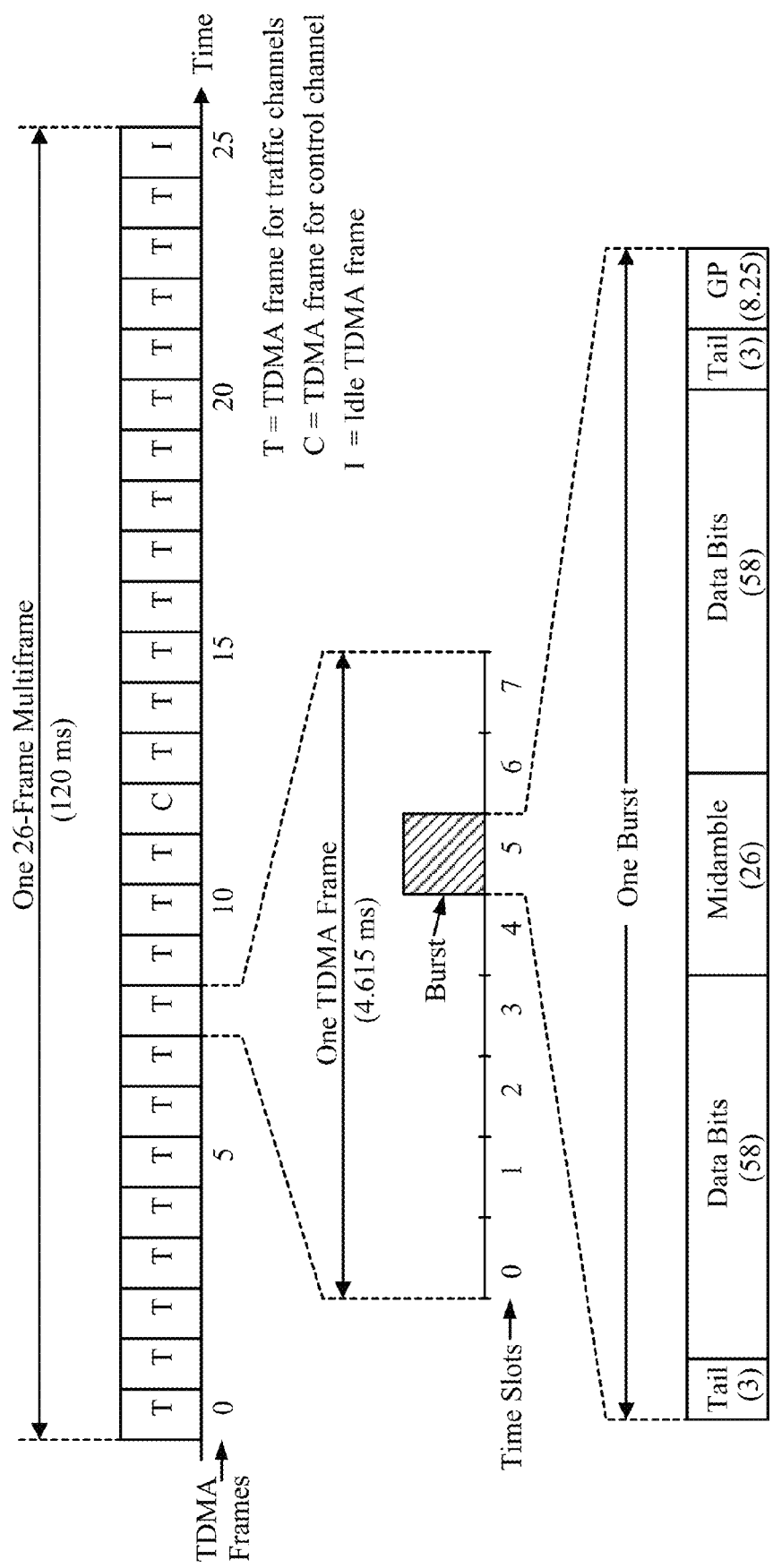
FIG. 3 shows example frame and burst formats in a TDMA system.

FIG. 3 of the accompanying drawings shows example frame and burst formats in a TDMA system. In a TDMA system, each time slot within a frame is used for transmitting a "burst" of data. Sometimes the terms time slot and burst may be used interchangeably. Each burst includes two tail fields, two data fields, a training sequence (or midamble) field, and a guard period (labeled GP in the figure). The number of symbols in each field is shown inside the parentheses in FIG. 3. A burst includes 148 symbols for the tail, data, and midamble fields. No symbols are sent in the guard period. TDMA frames of a particular carrier frequency are numbered and formed in groups of 26 or 51 TDMA frames called multiframes.

For traffic channels used to send user-specific data, each multiframe in this example includes 26 TDMA frames, which are labeled as TDMA frames 0 through 25. The traffic channels are sent in TDMA frames 0 to 11 and in TDMA frames 13 to 24 of each multiframe. A control channel is sent in TDMA frame 12. No data is sent in idle TDMA frame 25, which is used by the wireless devices to make measurements for neighbor base stations 110, 111, 114.

Figure 4:
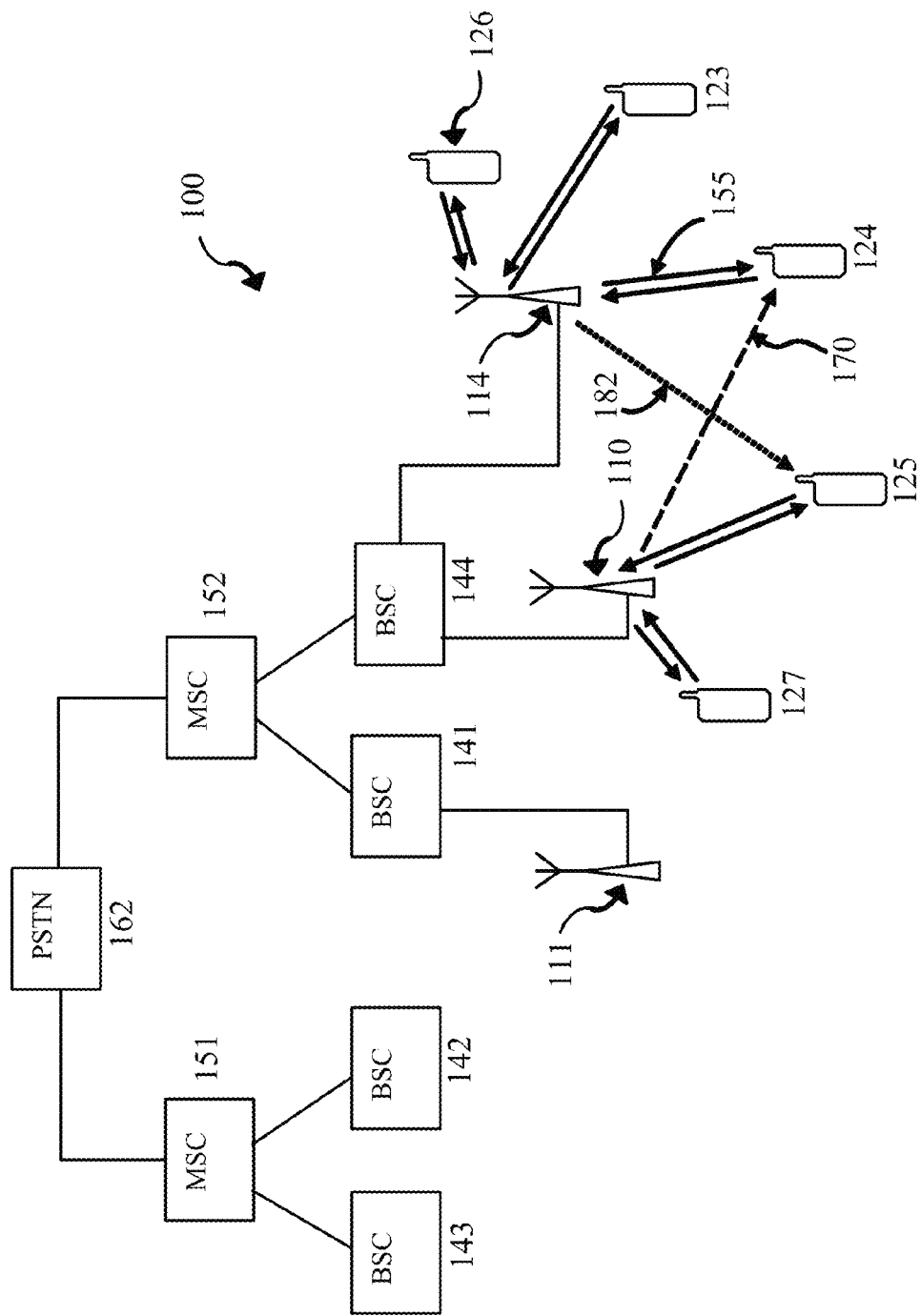
FIG. 4 shows part of a TDMA cellular system.

FIG. 4 of the accompanying drawings shows part of a TDMA cellular system 100. The system comprises base stations 110, 111 and 114 and remote stations 123, 124, 125, 126 and 127. Base station controllers 141 to 144 act to route signals to and from the different remote stations 123-127, under the control of mobile switching centres 151, 152. The mobile switching centres 151, 152 are connected to a public switched telephone network (PSTN) 162. Although remote stations 123-127 are commonly handheld mobile devices, many fixed wireless devices and wireless devices capable of handling data also fall under the general title of remote station 123-127.

Signals carrying, for example, voice data are transferred between each of the remote stations 123-127 and other remote stations 123-127 by means of the base station controllers 141-144 under the control of the mobile switching centres 151, 152. Alternatively, signals carrying, for example, voice data are transferred between each of the remote stations 123-127 and other communications equipment of other communications networks via the public switched telephone network 162. The public switched telephone network 162 allows calls to be routed between the mobile cellular system 100 and other communication systems. Such other systems include other mobile cellular communications systems 100 of different types and conforming to different standards.

Each of remote stations 123-127 can be serviced by any one of a number of base stations 110, 111, 114. A remote station 124 receives both a signal transmitted by the serving base station 114 and signals transmitted by nearby non-serving base stations 110, 111 and intended to serve other remote stations 125.

The strengths of the different signals from base stations 110, 111, 114 are periodically measured by the remote station 124 and reported to BSC 144, 114, etc. If the signal from a nearby base station 110, 111 becomes stronger than that of the serving base station 114, then the mobile switching centre (MSC) 152 acts to make the nearby base station 110, 111 become the serving base station and acts to make the serving base station 114 become a non-serving base station. The MSC 152 thus performs a handover of the remote station to the nearby base station 110. Handover refers to the method of transferring a data session or an ongoing call from one channel to another.

In cellular mobile communications systems, radio resources are divided into a number of channels. Each active connection (for example a voice call) is allocated a particular channel having a particular channel frequency for the downlink signal (transmitted by the base station 110, 111, 114 to a remote station 123-127 and received by the remote station 123-127) and the channel having a particular channel frequency for the uplink signal (transmitted by the remote station 123-127 to the base station 110, 111, 114 and received by the base station 110, 111, 114). The frequencies for downlink and uplink signals are often different, to allow simultaneous transmission and reception and to reduce interference between transmitted signals and received signals at either the remote station 123-127 or the base station 110, 111, 114. This is known as frequency division duplex (FDD).

Figure 5:
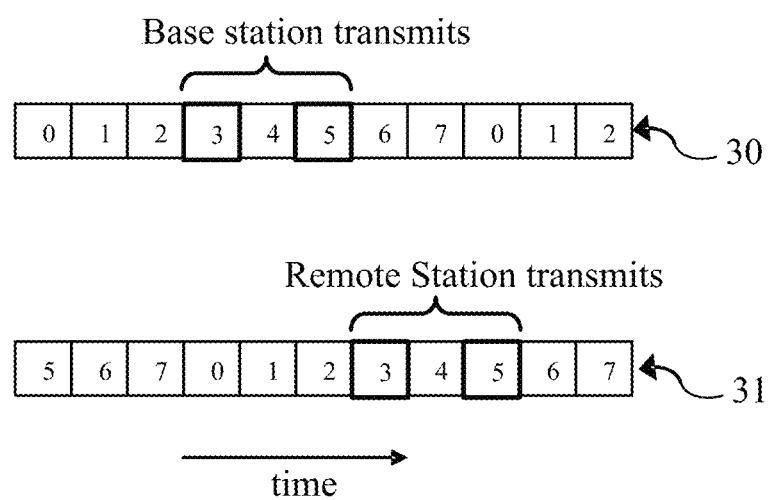
FIG. 5 shows an example arrangement of time slots for a TDMA communications system.

FIG. 5 of the accompanying drawings shows an example arrangement of time slots for a TDMA communications system. A base station 114 transmits data signals in a sequence of numbered time slots 30, each signal being for only one of a set of remote stations 123-127 and each signal being received at the antenna of all remote stations 123-127 within range of the transmitted signals. The base station 114 transmits all the signals using time slots on an allocated channel frequency. Each channel frequency and time slot combination thus comprises a channel for communication. For example, a first remote station 124 and a second remote station 126 are both allocated the same channel frequency. The first remote station 124 is allocated a first time slot 3 and a second remote station 126 is allocated a second time slot 5. The base station 114 transmits, in this example, a signal for the first remote station 124 during time slot 3 of the sequence of time slots 30, and transmits a signal for the second remote station 126 during time slot 5 of the sequence of time slots 30.

The first and second remote stations 124, 126 are active during their respective time slots 3 and 5 of time slot sequence 30, to receive the signals from the base station 114. The remote stations 124, 126 transmit signals to the base station 114 during corresponding time slots 3 and 5 of time slot sequence 31 on the uplink. It can be seen that the time slots for the base station 114 to transmit (and the remote stations 124, 126 to receive) 30 are offset in time with respect to the time slots for the remote stations 124, 126 to transmit (and the base station 114 to receive) 31.

This offsetting in time of transmit and receive time slots is known as time division duplexing (TDD), which among other things, allows transmit and receive operations to occur at different instances of time.

Voice signals and data signals are not the only signals to be transmitted between the base station 110, 111, 114 and the remote station 123-127. A control channel is used to transmit data that controls various aspects of the communication between the base station 110, 111, 114 and the remote station 123-127. Among other things, the base station 110, 111, 114 uses the control channel to send to the remote station 123-127 a sequence code, or training sequence code (TSC) which indicates which of a set of sequences the base station 110, 111, 114 will use to transmit the signal to the remote station 123-127. In GSM, a 26-bit training sequence is used for equalization. This is a known sequence which is transmitted in a signal in the middle of every burst.

The sequences are used by the remote station 123-127: to compensate for channel degradations which vary quickly with time; to reduce interference from other sectors or cells; and to synchronize the remote station's receiver to the received signal. These functions are performed by an equalizer which is part of the remote station's 123-127 receiver. An equalizer 426 determines how the known transmitted training sequence signal is modified by multipath fading. The equalizer may use this information to extract the desired signal from unwanted reflections of the signal by constructing an inverse filter to extract parts of the desired signal which have been corrupted by multipath fading. Different sequences (and associated sequence codes) are transmitted by different base stations 110, 111, 114 in order to reduce interference between sequences transmitted by base stations 110, 111, 114 that are close to each other.

A remote station 123-127 which comprises a receiver having enhanced co-channel rejection capability is able to use the sequence to distinguish the signal transmitted to it by a base station 110, 111, 114 from other unwanted signals transmitted by other base stations 110, 111, 114. This holds true so long as the received amplitudes or power levels of the unwanted signals are below a threshold relative to the amplitude of the wanted signal. The unwanted signals can cause interference to the wanted signal if they have amplitudes above this threshold. The threshold can vary according to the capability of the remote station's 123-127 receiver. The interfering signal and the desired (or wanted) signal can arrive at the remote station's 123-127 receiver contemporaneously if, for example, the signals from the serving and non-serving base stations 110, 111, 114 share the same time slot for transmitting. An example of remote station 123-127 which has enhanced co-channel rejection capability is a remote station 123-127 comprising a receiver having downlink advanced receiver performance (DARP), which is described in cellular standards such as those defining the system known as Global System for Mobile communication (GSM) which is an example of a TDMA system.

A remote station 123-127 which has enhanced co-channel rejection capability by means of DARP, is able to use the training sequences to distinguish a first signal from a second signal and to demodulate and use the first signal, when the amplitudes of the first and second signals are substantially within, say, 10 dB of each other. Each DARP mobile station will treat the signal intended for another mobile station 123-127 as co-channel interference (CCI) and reject the interference.

Referring again to FIG. 4, at remote station 124 transmissions from base station 110 for remote station 125 can interfere with transmissions from base station 114 for remote station 124. The path of the interfering signal is shown by dashed arrow 170. Similarly, at remote station 125 transmissions from base station 114 for remote station 124 can interfere with transmissions from base station 110 for remote station 125 (the path of the interfering signal shown by dotted arrow 182).

having enhanced co-channel rejection capability. DARP capability may be implemented by means of a method known as single antenna interference cancellation (SAIC) or by means of a method known as dual antenna interference cancellation (DAIC).

The DARP feature works better when the amplitudes of the received co-channel signals are similar. This situation may typically occur when each of two remote stations 123-127, each communicating with a different base station 110, 111, 114, is near a cell boundary, where the path losses from each base station 110, 111, 114 to each remote station 123-127 are similar.

A remote station 123-127 that is not DARP-capable, by contrast, may only demodulate the wanted signal if the unwanted co-channel interferer signal has an amplitude, or power level, lower than the amplitude of the wanted signal. In one example, it must be lower by at least 8 dB in order to allow the receiver to demodulate the wanted signal. The DARP-capable remote station 123-127 can therefore tolerate a much higher-amplitude co-channel signal relative to the wanted signal, than can the remote station 123-127 not having DARP capability.

The co-channel interference (CCI) ratio is the ratio between the power levels, or amplitudes, of the wanted and unwanted signals expressed in dB. In one example, the co-channel interference ratio could be, for example, −6 dB (whereby the power level of the wanted signal is 6 dB lower than the power level of the co-channel interferer (unwanted)

TABLE 1

| Row | Base station transmitting the signal | Remote station 1 receiving the signal | Channel frequency of the signal | Remote station 2 for which the signal is | Downlink time slot (TS) of the signal | Training sequence code (TSC) of the signal | Received power level at remote station 1 | Signal category |
|---|---|---|---|---|---|---|---|---|
| 2 | 114 | 123 | 41 | 123 | 5 | TSC 3 | −40 dBm | Wanted |
| 3 | 114 | 124 | 32 | 124 | 3 | TSC 3 | −82 dBm | Wanted |
| 4 | 110 | 124 | 32 | 125 | 3 | TSC 1 | −81 dBm | Interferer |
| 5 | | | | | | | | |
| 6 | 114 | 125 | 32 | 124 | 3 | TSC 3 | −79 dBm | Interferer |
| 7 | 110 | 125 | 32 | 125 | 3 | TSC 1 | −80 dBm | Wanted |

Table 1 above shows example values of parameters for signals transmitted by the two base stations 110 and 114 illustrated in FIG. 4. The information in rows 3 and 4 of the table show that for remote station 124 both a wanted signal from a first base station 114 and an unwanted interferer signal from a second base station 110 and intended for remote station 125 are received and the two received signals have the same channel and similar power levels (−82 dBm and −81 dBm respectively). Similarly, the information in rows 6 and 7 shows that for remote station 125 both a wanted signal from the second base station 110 and an unwanted interferer signal from the first base station 114 and intended for remote station 124 are received and the two received signals have the same channel and similar power levels (−80 dBm and −79 dBm respectively).

Each remote station 124, 125 thus receives both a wanted signal and an unwanted interferer signal that have similar power levels from different base stations 114, 110, on the same channel (i.e. contemporaneously). Because the two signals arrive on the same channel and similar power levels, they interfere with each other. This may cause errors in demodulation and decoding of the wanted signal. This interference is the co-channel interference discussed above.

The co-channel interference may be mitigated to a greater extent than previously possible, by the use of DARP-enabled remote stations 123-127, and base stations 110, 111, 114 signal). In another example, the ratio may be +6 dB (whereby the power level of the wanted signal is 6 dB higher than the power level of the co-channel interferer (unwanted) signal). For DARP-enabled remote stations 123-127 with good performance, the remote stations 123-127 can still process the wanted signal when the amplitude of the interferer signal is around 10 dB higher than the amplitude of the wanted signal, and. If the amplitude of the interferer signal is 10 dB higher than the amplitude of the wanted signal, the co-channel interference ratio is −10 dB.

DARP capability, as described above, improves a remote station's 123-127 reception of signals in the presence of ACI or CCI. A new user, with DARP capability, will better reject the interference coming from an existing user. The existing user, also with DARP capability, would do the same and not be impacted by the new user. In one example, DARP works well with CCI in the range of 0 dB (same level of co-channel interference for the signals) to −6 dB (co-channel is 6 dB stronger than the desired or wanted signal). Thus, two users using the same ARFCN and same timeslot, but assigned different TSCs, will get good service.

The DARP feature allows two remote stations 124 and 125, if they both have the DARP feature enabled, to each receive wanted signals from two base stations 110 and 114, the wanted signals having similar power levels, and each remote station 124, 125 to demodulate its wanted signal. Thus, the DARP enabled remote stations 124, 125 are both able to use the same channel simultaneously for data or voice.

The feature described above of using a single channel to support two simultaneous calls from two base stations 110, 111, 114 to two remote stations 123-127 is somewhat limited in its application in the prior art. To use the feature, the two remote stations 124, 125 are within range of the two base stations 114, 110 and are each receiving the two signals at similar power levels. For this condition, typically the two remote stations 124, 125 would be near the cell boundary, as mentioned above. It is desirable to increase, by some other means, the number of active connections to remote stations that can be handled by a base station.

A method and apparatus will now be described which allows the supporting of two or more simultaneous calls on the same channel (consisting of a time slot on a carrier frequency), each call comprising communication between a single base station 110, 111, 114 and one of a plurality of remote stations 123-127 by means of a signal transmitted by the base station 110, 111, 114 and a signal transmitted by the remote station 123-127. This supporting of two or more simultaneous calls on the same channel is known as Multi-User on One Slot (MUROS) or as Voice services over Adaptive Multi-user on One timeSlot (VAMOS). Since two training sequences may be used for signals in the same time slot on the same carrier frequency in the same cell by the same base station 110, 111, 114, twice as many communication channels may be used in the cell.

Figure 6:
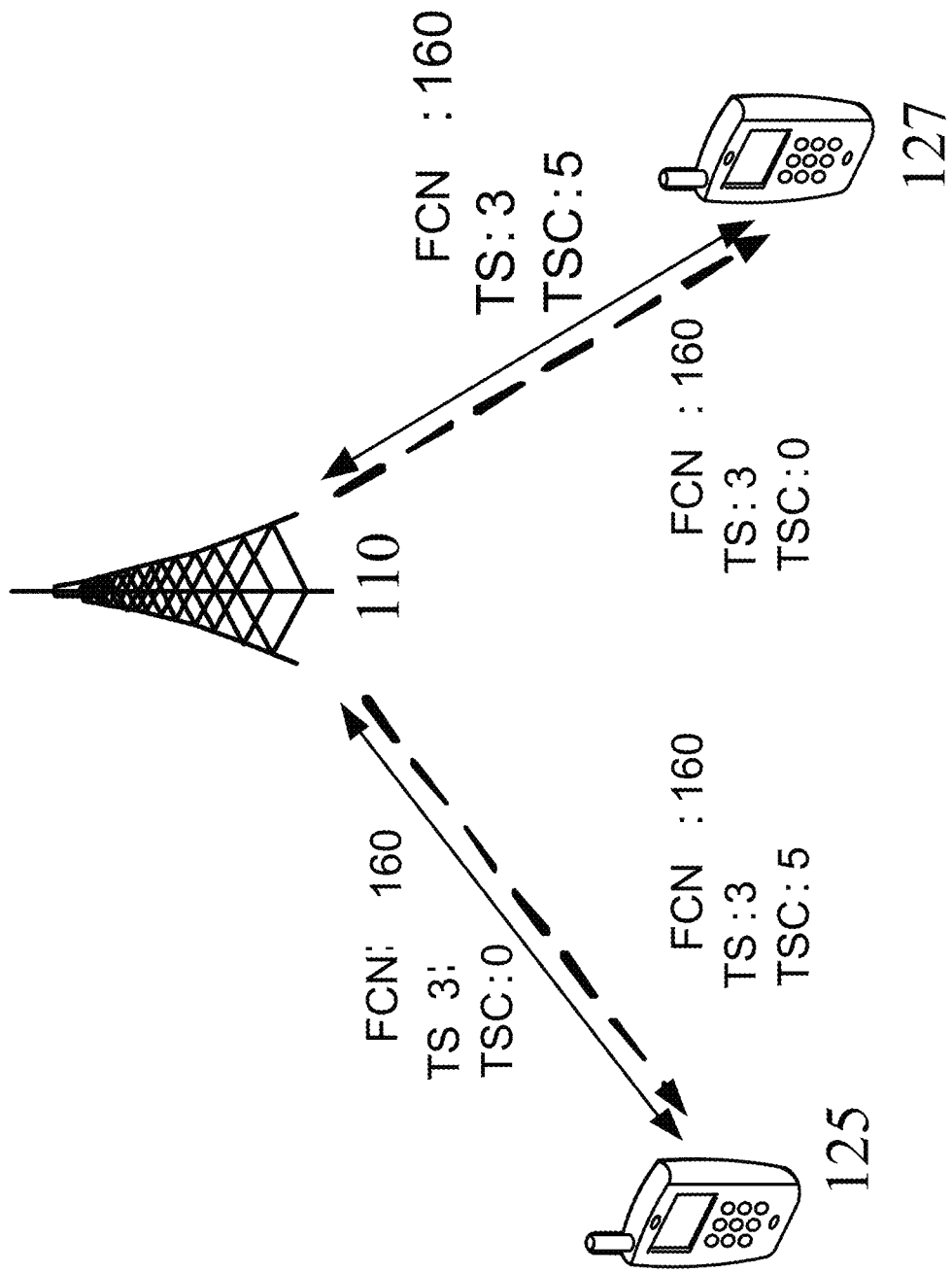
FIG. 6 shows a simplified representation of part of a TDMA cellular system adapted to assign the same channel to two remote stations.

FIG. 6 of the accompanying drawings shows a simplified representation of part of a TDMA cellular system adapted to assign the same channel to two remote stations 125, 127. The system comprises a base station 110, and two remote stations 125, 127. The network can assign, via the base station 110, the same channel frequency and the same time slot (i.e. the same channel) to the two remote stations 125 and 127. The network allocates different training sequences to the two remote stations 125 and 127 which are both assigned: a channel frequency having frequency channel number (FCN) equal to 160; and a time slot with time slot index (TS) equal to 3. Remote station 125 is assigned a training sequence code (TSC) of 5 whereas 127 is assigned a training sequence code (TSC) of 0. Each remote station 125, 127 will receive its own signal (shown by solid lines in the figure) together with the co-channel (co-TCH) signal intended for the other remote station 125, 127 (shown by dotted lines in the figure). Each remote station 125, 127 is able to demodulate its own signal whilst rejecting the unwanted signal.

DARP, when used along with the embodiments described herein, therefore enables a TDMA network to use a channel already in use (i.e., a channel frequency and time slot that is already in use) to serve additional users. In one example, each channel can be used for two users for full-rate (FR) speech and by four users for half-rate (HR) speech. It is also possible to serve a third or even a fourth user if the users' receivers have sufficiently good DARP performance. In order to serve additional users using the same channel, the network transmits the additional users' RF signals on the same carrier (channel frequency), using optionally different phase shifts, and assigns to the additional users the same timeslot that is in use, using a different TSC from that used by the current user. The transmitted bursts of data each comprise the training sequence corresponding to the TSC. A DARP capable receiver may detect the wanted or desired signal for that receiver while rejecting the unwanted signal for another receiver. It is possible to add third and fourth users in the same way as for the first and second users.

Single-antenna interference cancellation (SAIC) is used to reduce Co-Channel Interference (CCI). The 3G Partnership Project (3GPP) has standardized SAIC performance. The 3GPP adopted the term 'downlink advanced receiver performance' (DARP) to describe the receiver that applies SAIC.

DARP increases network capacity by employing lower reuse factors. Furthermore, it suppresses interference at the same time. DARP operates at the baseband part of a receiver of a remote station 123-127. It suppresses adjacent-channel and co-channel interference that differ from general noise. DARP is available in previously defined GSM standards (since Rel-6 in 2004) as a release-independent feature, and is an integral part of Rel-6 and later specs. The following is a description of two DARP methods.

The first DARP method is the joint detection/demodulation (JD) method. JD uses knowledge of the GSM signal structure in adjacent cells in synchronous mobile networks to demodulate one of several interference signals in addition to the desired signal. JD's ability to demodulate interference signals allows the suppression of specific adjacent-channel interferers. In addition to demodulating GMSK signals, JD also can be used to demodulate EDGE signals. Blind interferer cancellation (BIC) is another method used in DARP to demodulate the GMSK signal. With BIC, the receiver has no knowledge of the structure of any interfering signals that may be received at the same time that the desired signal is received. Since the receiver is effectively "blind" to any adjacent-channel interferers, the method attempts to suppress the interfering component as a whole. The GMSK signal is demodulated from the wanted carrier by the BIC method. BIC is most effective when used for GMSK-modulated speech and data services and can be used in asynchronous networks.

A DARP capable remote station equalizer/detector 426 of the embodiments described herein and in the accompanying drawings also performs CCI cancellation prior to equalization, detection, etc. The equalizer/detector 426 in FIG. 2 provides demodulated data. CCI cancellation normally is available on a base station 110, 111, 114. Also, remote stations 123-127 may or may not be DARP capable. The network may determine whether a remote station is DARP capable at the resource assignment stage, a starting point of a call for a GSM remote station (e.g. mobile station) 123-127.

Figure 7:
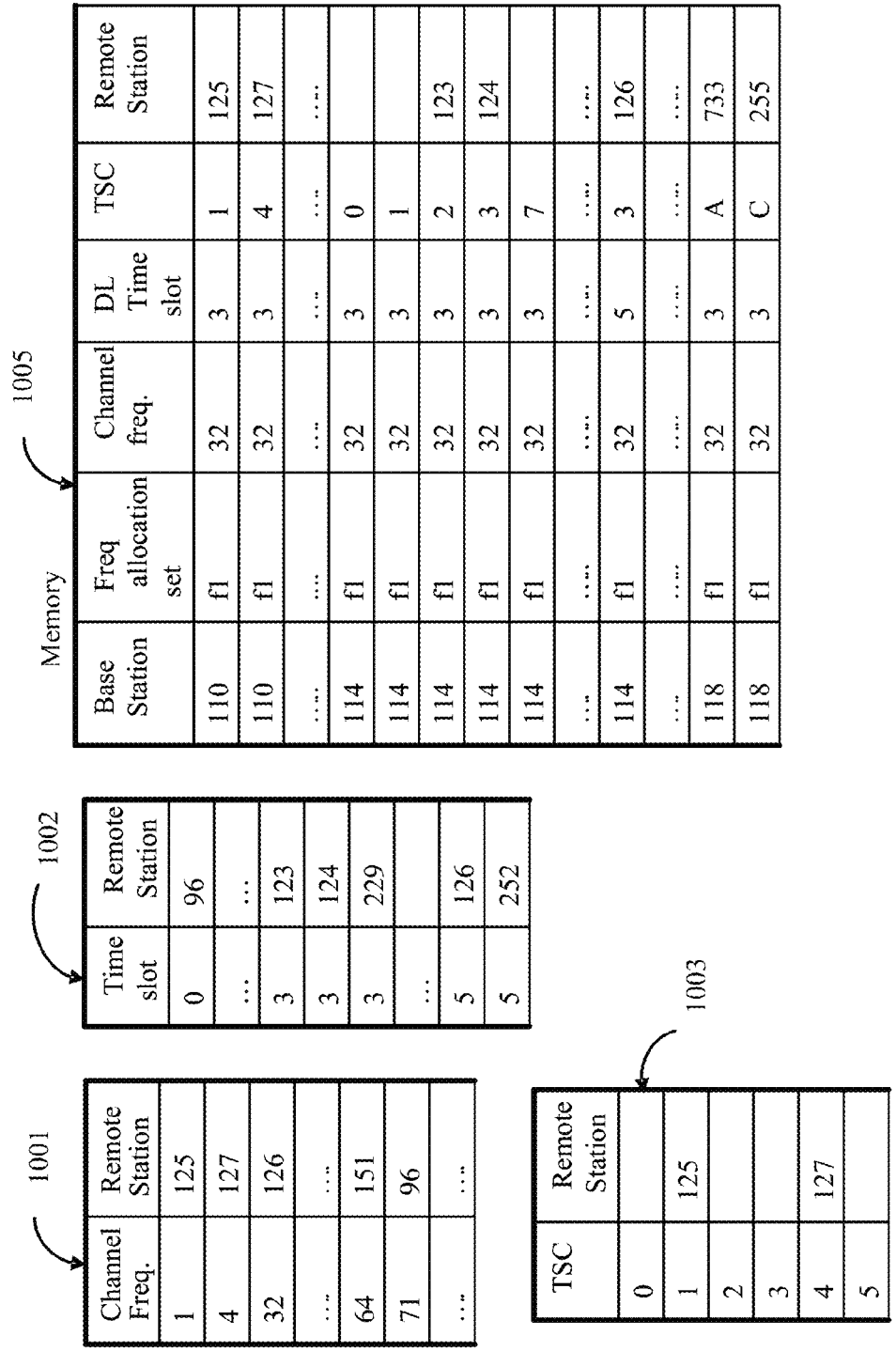
FIG. 7 shows example arrangements for data storage within a memory subsystem which might reside within a base station controller (BSC) of a cellular communication system.

FIG. 7 of the accompanying drawings shows example arrangements for data storage within a memory subsystem which might reside within a base station controller (BSC) of a cellular communication system 100. Table 1001 of the figure is a table of values of frequency channel numbers (FCN) assigned to remote stations 123-127, the remote stations 123-127 being numbered. Table 1002 of the figure is a table of values of time slots wherein remote station numbers 123-127 are shown against time slot number. It can be seen that time slot number 3 is assigned to remote stations 123, 124 and 229. Similarly table 1003 shows a table of data allocating training sequences (TSCs) to remote stations 123-127.

Table 1005 of the figure shows an enlarged table of data which is multi-dimensional to include all of the parameters shown in tables 1001, 1002, and 1003 just described. It will be appreciated that the portion of table 1005 shown in the figure is only a small part of the complete table that would be used. Table 1005 shows in addition to the allocation of frequency allocation sets, each frequency allocation set corresponding to a set of frequencies used in a particular sector of a cell or in a cell. In Table 1005, frequency allocation set f1 is assigned to all remote stations 123-127 shown in the table 1005 of the figure. It will be appreciated that other portions of Table 1005, which are not shown, will show frequency allocation sets f2, f3 etc. assigned to other remote stations 123-127. The fourth row of data shows no values but repeated dots indicating that there are many possible values not shown between rows 3 and 5 of the data in table 1001.

FIG. 8 of the accompanying drawings shows a method for assigning a channel already in use by one remote station 123-127 to another remote station 123-127.

Following the start of the method 1501, a decision is made as to whether to set up a new connection between the base station 110, 111, 114 and a remote station 123-127 (block 1502). If the answer is NO, then the method moves back to the start block 1501 and the steps above are repeated. When the answer is YES (block 1502) then a determination is made as to whether there is an unused channel, i.e. an unused time slot for any either used or unused channel frequency (block 1503). If there is an unused time slot then a new time slot is allocated (block 1504). The method then moves back to the start block 1501 and the steps above are repeated.

Eventually there is no longer an unused time slot (because all time slots are already used or allocated for connections), and therefore the answer to the question of block 1503 is NO, and the method moves to block 1505. In block 1505 a used time slot is selected for the new connection to share with an existing connection.

A first used time slot (channel) having been selected for the new connection to share along with an existing connection. The existing connection uses a first training sequence. A second training sequence, different from the first training sequence, is then selected for the new connection in block 1506. The method then moves back to the start block 1501 and the steps above are repeated.

FIG. 9 of the accompanying drawings is a schematic diagram of apparatus wherein the method represented by FIG. 8 resides in a base station controller 600. Within the base station controller 600 are controller processor 660 and memory subsystem 650. The steps of the method may be stored in software 680, in memory 685, in memory subsystem 650 or within software in memory residing in controller processor 660, or within software or memory in the base station controller 600, or within some other digital signal processor (DSP) or in other forms of hardware. The base station controller 600 is connected to the mobile switching centre 610 and also to base stations 620, 630 and 640.

Shown within memory subsystem 650 are parts of three tables of data 651, 652, 653. Each table of data stores values of a parameter for a set of remote stations 123, 124 indicated by the column labeled MS. Table 651 stores values of training sequence code. Table 652 stores values for time slot number TS. Table 653 stores values of channel frequency CHF. It can be appreciated that the tables of data could alternatively be arranged as a multi-dimensional single table or several tables of different dimensions to those shown in the figure.

The controller processor 660 communicates via data bus 670 with memory subsystem 650 in order to send and receive values for parameters to/from memory subsystem 650. Within controller processor 660 are contained functions that include a function 661 to generate an access grant command, a function 662 to send an access grant command to a base station 620, 630, 640, a function 663 to generate a traffic assignment message, and a function 664 to send a traffic assignment message to a base station 620, 630 or 640. These functions may be executed using software 680 stored in memory 685.

Within the controller processor 660, or elsewhere in the base station controller 600, there may also be a power control function 665 to control the power level of a signal transmitted by a base station 620, 630 or 640.

It can be appreciated that the functions shown as being within base station controller 600, namely memory subsystem 650 and controller processor 660 could also reside in the mobile switching centre 610. Some or all of the functions described as being part of base station controller 600 could equally well reside in one or more of base stations 620, 630 or 640.

Phase Shift

The absolute phase of the modulation for the two signals transmitted by the base station 110, 111, 114 may not be identical. In order to serve an additional user using the same channel (co-TCH), in addition to providing more than one TSC the network may phase shift the data symbols of the signal for the new co-channel (co-TCH) remote station with respect to the signal for the already-connected co-channel remote station(s). If possible the network may provide evenly spaced phase shift, thus improving receiver performance. For one example of two users sharing a channel, the phase difference for one user relative to another user could be 90 degrees apart. For another example in which three users share a channel, the phase difference for one user relative to another user could be 60 degrees apart. The phase shift for four users could be 45 degree apart. As stated above, the users will each use a different TSC.

Thus, for improved DARP performance, the two signals intended for the two different remote stations 123, 124 may ideally be phase shifted by n/2 for the best channel impulse response, but a phase shift less than this will also provide adequate performance.

To provide the two signals so that their phases are offset from each other by 90 degrees, the first transmitter 1120 modulates the two signals at 90 degrees phase shift to each other, thus further reducing interference between the signals due to phase diversity.

In this way, the transmitting apparatus 1200 provides means at the base station 620, 920 for introducing a phase difference between contemporaneous signals using the same time slot on the same frequency and intended for different remote stations 123, 124. Such means can be provided in other ways. For example, separate signals can be generated in the transmitting apparatus 1200 and resulting analogue signals can be combined in a transmitter front end by passing one of them through a phase shift element and then simply summing the phase shifted and non-phase shifted signals.

Power Control Aspects

Table 2 below shows example values of channel frequency, time slot, training sequence and received signal power level for signals transmitted by the two base stations 110 and 114, and received by remote stations 123 to 127, shown in FIG. 4.

TABLE 2

| Row | BASE STATION transmitting the signal | Remote station 1 receiving the signal | Base Station 1 serving Remote station 1 | Remote station for which the signal is intended | Channel frequency. | Downlink TS | TSC | MS Received power level of signal | Signal category |
|---|---|---|---|---|---|---|---|---|---|
| 2 | 114 | 126 | 114 | 126 | 32 | 5 | TSC 3 | −33 dBm | Wanted |
| 3 | 114 | 123 | 114 | 123 | 32 | 3 | TSC 2 | −67 dBm | Wanted |
| 4 | 114 | 124 | 114 | 124 | 32 | 3 | TSC 3 | −102 dBm | Wanted |
| 5 | 114 | 123 | 114 | 124 | 32 | 3 | TSC 3 | −67 dBm | interferer |
| 6 | 114 | 124 | 114 | 123 | 32 | 3 | TSC 2 | −102 dBm | interferer |
| 7 | 114 | 125 | 110 | 124 | 32 | 3 | TSC 3 | −105 dBm | interferer |
| 8 | 110 | 124 | 114 | 125 | 32 | 3 | TSC 1 | −99 dBm | interferer |
| 9 | 110 | 125 | 110 | 125 | 32 | 3 | TSC 1 | −101 dBm | Wanted |
| 10 | 110 | 127 | 110 | 127 | 32 | 3 | TSC 4 | −57 dBm | Wanted |

The rows 3 and 4 of the table, outlined by a bold rectangle, show both remote station 123 and remote station 124 using channel frequency having index 32 and time slot 3, for receiving a signal from base station 114 but the remote stations 123, 124 are allocated different training sequences TSC2 and TSC3 respectively. Similarly, rows 9 and 10 also show the same channel frequency and time slot being used for two remote stations 125, 127 to receive signals from the same base station 110. It can be seen that in each case the received power levels of the wanted signals are substantially different for the two remote stations 125, 127 (−101 and −57 dBm respectively).

The highlighted rows 3 and 4 of Table 3 show that base station 114 transmits a signal for remote station 123 and also transmits a signal for remote station 124. The received power levels of the wanted signals are substantially different for the two remote stations 123, 124. The received power level at remote station 123 is −67 dBm whereas the received power level at remote station 124 is −102 dBm. Rows 9 and 10 of Table 3 show that base station 110 transmits a signal for remote station 125 and also transmits a signal for remote station 127. The received power level at remote station 125 is −101 dBm whereas the received power level at remote station 127 is −57 dBm. The large difference in power level, in each case, could be due to different distances of the remote stations 125, 127 from the base station 110. Alternatively, the difference in power levels could be due to different path losses or different amounts of multi-path cancellation of the signals, between the base station 10, 111, 114 transmitting the signals and the remote station 123-127 receiving the signals, for one remote station 123-127 as compared to the other remote station 123-127.

Although this difference in received power level for one remote station 123-127 compared to the other remote station 123-127 is not intentional and not ideal for cell planning, it does not compromise the operation of the embodiments described herein and in the accompanying drawings.

A remote station 123-127 having DARP capability may successfully demodulate either one of two co-channel, contemporaneously received signals, so long as the amplitudes or power levels of the two signals are similar at the remote station's 123-127 antenna. This is achievable if the signals are both transmitted by the same base station 110, 111, 114 and the transmitted power levels of the two signals are substantially the same. Each of a first and second remote stations 123-127 receives the two signals at substantially the same power level (say within 6 dB of each other) because the path losses for the two signals between the base station and the first remote station are similar, and the path losses for the two signals between the base station and the second remote station are similar. The transmitted powers are similar if either the base station 110, 111, 114 is arranged to transmit the two signals at similar power levels, or the base station 110, 111, 114 transmits both signals at a fixed power level. This situation can be illustrated by further reference to Table 2 and by reference Table 3.

While Table 2 shows remote stations 123, 124 receiving from base station 114 signals having substantially different power levels, on closer inspection it can be seen that, as shown by rows 3 and 5 of Table 2, remote station 123 receives two signals from base station 114 at the same power level (−67 dBm), one signal being a wanted signal intended for remote station 123 and the other signal being an unwanted signal which is intended for remote station 124. The criteria for a remote station 123-127 to receive signals having similar power levels is thus shown as being met in this example. If mobile station 123 has a DARP receiver, it can, in this example, therefore demodulate the wanted signal and reject the unwanted signal.

Similarly, it can be seen by inspecting rows 4 and 6 of Table 2 (above) that remote station 124 receives two signals sharing the same channel and having the same power level (−102 dBm). Both signals are from base station 114. One of the two signals is the wanted signal, for remote station 124 and the other signal is the unwanted signal which is intended for use by remote station 123.

To further illustrate the above concepts, Table 3 is an altered version of Table 2 wherein the rows of Table 2 are simply re-ordered. It can be seen that remote stations 123 and 124 each receive from one base station 114 two signals, a wanted and an unwanted signal, having the same channel and similar power levels. Also, remote station 125 receives from two different base stations 110, 114 two signals, a wanted and an unwanted signal, having the same channel and similar power levels.

TABLE 3

| Row | BASE STATION transmitting the signal | Remote station 1 receiving the signal | Base Station 1 serving Remote station 1 | Remote station for which the signal is intended | Channel frequency. | Downlink TS | TSC | MS Received power level of signal | Signal category |
|---|---|---|---|---|---|---|---|---|---|
| 2 | 114 | 126 | 114 | 126 | 32 | 5 | TSC 3 | −33 dBm | wanted |
| 3 | 114 | 123 | 114 | 123 | 32 | 3 | TSC 2 | −67 dBm | wanted |
| 4 | 114 | 123 | 114 | 124 | 32 | 3 | TSC 3 | −67 dBm | interferer |

TABLE 3-continued

| Row | BASE STATION transmitting the signal | Remote station 1 receiving the signal | Base Station 1 serving Remote station 1 | Remote station for which the signal is intended | Channel frequency. | Downlink TS | TSC | MS Received power level of signal | Signal category |
|---|---|---|---|---|---|---|---|---|---|
| 5 | | | | | | | | | |
| 6 | 114 | 124 | 114 | 123 | 32 | 3 | TSC 2 | −102 dBm | interferer |
| 7 | 114 | 124 | 114 | 124 | 32 | 3 | TSC 3 | −102 dBm | wanted |
| 8 | 110 | 124 | 114 | 125 | 32 | 3 | TSC 1 | −99 dBm | interferer |
| 9 | | | | | | | | | |
| 10 | 114 | 125 | 110 | 127 | 32 | 3 | TSC 3 | −105 dBm | interferer |
| 11 | 110 | 125 | 110 | 125 | 32 | 3 | TSC 1 | −101 dBm | wanted |
| | 110 | 127 | 110 | 127 | 32 | 3 | TSC 4 | −57 dBm | wanted |

It is possible for a base station 110, 111, 114 to maintain a call with two remote stations 123-127 using the same channel, such that a first remote station 123-127 has a DARP-enabled receiver and a second remote station 123-127 does not have a DARP-enabled receiver. The amplitudes of signals received by the two remote stations 124-127 are arranged to be different by an amount which is within a range of values (in one example it may be between 8 dB and 10 dB) and also arranged such that the amplitude of the signal intended for the DARP-enabled remote station is lower than the amplitude of the signal intended for the non-DARP-enabled remote station 124-127.

An advantage with MUROS enabled networks is that the base station 110, 111, 114 may use two or more training sequences per timeslot instead of only one so that both signals may be treated as desired signals. The base station 110, 111, 114 transmits the signals at suitable amplitudes so that each remote station receives its own signal at a high enough amplitude and the two signals maintain an amplitude ratio such that the two signals corresponding to the two training sequences may be detected. This feature may be implemented using software stored in memory in the base station 110, 111, 114 or BSC 600. For example, remote stations 123-127 are selected for pairing based on their path losses being similar and based on existing traffic channel availability. However, MUROS can still work if the path losses are very different for one remote station than for the other remote station 123-127. This may occur when one remote station 123-127 is much further away from the base station 110, 111, 114 than for the other remote station.

Regarding power control there are different possible combinations of pairings. Both remote stations 123-127 can be DARP capable, or only one DARP capable. In both cases, the received amplitudes or power levels at the mobiles 123-127 may be within 10 dB of each other. However if only one remote station 123-127 is DARP capable, a further constraint is that the non-DARP remote station 123-127 has its wanted (or desired) first signal higher than the second signal (in one example, at least 8 dB higher than the second signal). The DARP capable remote station 123-127 receives its second signal no more than a lower threshold below the first signal (in one example, it is no lower than 10 dB below the first signal). Hence in one example, the amplitude ratio can be 0 dB to ±10 dB for DARP/DARP capable remote stations 123-127 or an 8 dB to 10 dB higher signal for a non-DARP/DARP pairing in favor of the non-DARP remote station 123-127. Also, it is preferable for the base station 110, 111, 114 to transmit the two signals so that each remote station 123-127 receives its wanted signal at a power level above its sensitivity limit. (In one example, it is at least 6 dB above its sensitivity limit. So if one remote station 123-127 has more path loss, the base station 110, 111, 114 transmits that remote station's 123-127 signal at power level or amplitude appropriate to achieve this. This sets the transmitted power level. The required difference between the levels of the two signals then determines the absolute power level of that other signal.

FIG. 10 of the accompanying drawings shows receiver architecture for a remote station 123-127 having enhanced co-channel rejection capability. The receiver is adapted to use either the single antenna interference cancellation (SAIC) equalizer 1105, or the maximum likelihood sequence estimator (MLSE) equalizer 1106. The SAIC equalizer is preferred for use when two signals having similar amplitudes are received. The MLSE equalizer is typically used when the amplitudes of the received signals are not similar, for example when the wanted signal has an amplitude much greater than that of an unwanted co-channel signal.

Selecting a Receiving Apparatus for Co-Channel Operation

As described above, MUROS allows more than one user on the same traffic channel (TCH) which results in enhanced capacity. This can be achieved by taking advantage of the DARP capability of remote stations 123-127. A DARP remote station 123-127 offers more pairing opportunities when paired with another DARP remote station 123-127 because the DARP remote station can tolerate an unwanted co-channel signal at a higher power level than that of its own wanted signal, as explained above. However it is still possible to pair a non-DARP remote station 123-127 with a DARP remote station 123-127 for co-channel (i.e. MUROS) operation, as also described above. Therefore, it is advantageous to be able to select a remote station 123-127 for MUROS operation when it is not known whether or not the remote station 123-127 has DARP capability. It is also advantageous to be able to select a remote station 123-127 for MUROS operation without the need for a message to be transmitted indicating that the remote station has MUROS capability. This is because the system cannot produce such a message if the remote station 123-127 is a so-called legacy remote station which does not indicate that it has DARP capability. Apparatus and methods for selecting either a DARP or a non-DARP remote station 123-127 are described below.

If a transmitter is to transmit two co-channel signals, one for each of two receivers, then knowledge about each receiver's co-channel rejection capability is used, in order firstly to decide if both receivers are capable of handling the two co-channel signals and secondly to set the power levels of the transmitted signals in the correct ratio to ensure each receiver can handle the two signals. For example, one receiver may be non-DARP or one receiver may be further away from the transmitter than the other receiver, and both these factors determine the most suitable power levels of the transmitted signals, as described above.

A base station 110, 111, 114 may identify a remote station's 123-127 DARP capability by requesting the remote station's 123-127 classmark. A classmark is a declaration from a remote station 123-127 to a base station 110, 111, 114 of its capabilities. This is described, for example, in 24.008 of TS10.5.1.5-7 in the GERAN standards. Currently, the standards define a classmark indicative of a remote station's 123-127 DARP capability but so far, no MUROS classmark or classmark indicating support of new training sequences has been defined.

Additionally, despite the definition of a DARP classmark in the standards, the standards do not require the remote station 123-127 to send the classmark to the base station 110, 111, 114. In fact, many manufacturers do not design their DARP-capable remote stations 123-127 to send the DARP classmark to the base station 110, 111, 114 on call setup procedures for fear that their remote stations 123-127 will automatically be assigned to noisier channels by the base station 110, 111, 114, thereby potentially degrading the communication from that remote station 123-127. It is desirable to identify whether or not a legacy remote station 123-127 is MUROS capable without using the classmark. It is currently not possible to identify with any certainty, whether a remote station 123-127 is MUROS-capable or even DARP-capable, without a prior knowledge of a remote station's DARP capability being signaled.

A base station 110, 111, 114 may identify MUROS-capability in a remote station 123-127 based on the International Mobile Equipment Identity (IMEI) of the remote station 123-127. The base station 110, 111, 114 may establish the remote station's 123-127 IMEI by requesting it directly from the remote station 123-127. The IMEI is unique to the remote station 123-127 and can be used to reference a database located anywhere in the network, thereby identifying the model of mobile phone to which the remote station 123-127 belongs, and additionally its capabilities such as DARP and MUROS. If the phone is DARP or MUROS capable, it will be considered by the base station 110, 111, 114 as a candidate for sharing a channel with another suitable remote station 123-127. In operation, the base station 110, 111, 114 will build up a list of remote stations 123-127 currently connected to that base station 110, 111, 114 which are DARP or MUROS capable.

However, DARP or MUROS capability alone may not be a sufficient criterion for determining whether a particular remote station 123-127 can share a TDMA slot on the same frequency with another remote station 123-127.

One way of determining the interference rejection capability of a remote station 123-127 is to send a discovery burst. This is a short radio burst in which a signal for the remote station 123-127 has a known interference pattern superimposed on it. The discovery burst comprises a signal containing a first traffic data for the remote station (e.g. basic speech) comprising a first predefined data sequence (e.g. a first training sequence) and a second (co-channel) signal comprising second data comprising a second predefined data sequence (e.g. a second training sequence), both signals at predefined power levels.

FIG. 11 of the accompanying drawings is a schematic diagram of (a) a transmitting apparatus 1200 and (b) a receiving apparatus 1240 suitable for selecting a receiving apparatus for co-channel operation. The transmitting apparatus 1200 is configured to transmit two sets of data at predetermined power levels on a single channel. The receiving apparatus 1240 is configured to: receive the transmitted data; to measure a characteristic of the received data; and to transmit a signal indicating the characteristic. The transmitting apparatus 1200 and receiving apparatus 1240 are together suitable for selecting the receiving apparatus 1240 for co-channel operation. The features of the transmitting apparatus 1200 and receiving apparatus will now be described in more detail.

The transmitting apparatus 1200 comprises: a first transmitter 1220; a selector comprising a processor 1215 and a memory 1216; a first receiver 1217 coupled to the selector 1230, the first receiver configured to receive a first signal indicating a measured characteristic of transmitted data; and a third receiver 1218, coupled to the selector 1230, configured to receive a second signal indicating a co-channel rejection capability of a receiving apparatus.

A first data source 1201 is configured to output first data. A first multiplexer 1203, coupled to the first data source 1201, receives the first data and is configured: to time division multiplex the first data by allocating a first time slot to the first data; and to output the multiplexed first data.

A first power adjuster 1205, coupled to the first multiplexer 1203, is configured to adjust the power level of the multiplexed first data to produce first power-adjusted data. A first modulator 1207, coupled to the first power adjuster 1205, is configured to modulate the first power-adjusted data onto a first channel frequency to produce first modulated data 1209. A first amplifier 1211, coupled to the first modulator 1207, is configured to transmit the first modulated data 1209 to produce transmitted first data 1213.

A second data source 1202 is configured to output second data. A second multiplexer 1204, coupled to the second data source 1202, receives the second data and is configured: to time division multiplex the second data by allocating a second time slot to the second data; and to output the multiplexed second data.

A second power adjuster 1206, coupled to the second multiplexer 1204, is configured to adjust the power level of the multiplexed second data to produce second power-adjusted data. A second modulator 1208, coupled to the second power adjuster 1206, is configured to modulate the second power-adjusted data onto a second channel frequency to produce second modulated data 1210. A second amplifier 1212, coupled to the second modulator 1208, is configured to transmit the second modulated data 1210 to produce transmitted second data 1214. A combiner 1219, coupled to the first and second amplifiers 1211, 1212, is operable to combine the transmitted first and second data 1213, 1214, to produce combined transmitted first and second data. Optionally, the transmitted first and second data 1213, 1214 are each transmitted without being combined.

The receiving apparatus 1240 comprises a second receiver 1241 operable to receive the transmitted first and/or second data and to output received data. A demodulator 1242, coupled to the second receiver 1241, is operable to demodulate the received data to produce demodulated data. A demultiplexer 1243, coupled to the demodulator 1242, is operable to time division demultiplex the demodulated data to produce demultiplexed data. A data quality estimator 1244, coupled to the demultiplexer 1243, is operable to measure a characteristic of the data and to output an indication of the measured characteristic. For example, the data quality estimator 1244 may measure the bit error rate (BER), or the bit error probability (BEP) of the data. A second transmitter 1245, coupled to the quality estimator 1244, is operable to transmit a first signal comprising the indication of the measured characteristic.

The receiving apparatus also 1240 comprises a second processor 1247, configured to communicate with and control operation of: the demultiplexer 1243, data quality estimator 1244, and second transmitter 1245. The second processor 1247 may be configured to control the operation of the second receiver 1241, and the demodulator 1242. A second memory 1248, coupled to the second processor 1247, is configured to store, and transfer to the second processor 1247, data including instructions for the processor 1247 to use in controlling the operation of elements as described above.

The receiving apparatus 1240 also comprises a third transmitter 1246, coupled to the second processor 1247, operable to transmit a second signal comprising an indication of a co-channel rejection capability of the receiving apparatus 1240.

The transmitting apparatus 1200 further comprises a first receiver 1217 and a third receiver 1218, each coupled to the selector 1230. The first receiver 1217 is operable to receive the first signal transmitted by the second transmitter 1245 of the receiving apparatus 1240 and to output the indication of the measured characteristic to the selector 1230. The third receiver 1218 is operable: to receive the second signal transmitted by the third transmitter 1246 of the receiving apparatus 1240; and to output the indication of the co-channel rejection capability to the selector 1230.

The selector 1230 is arranged to select the receiving apparatus 1240 for co-channel operation depending on the measured characteristic, and/or to select the receiving apparatus 1240 for co-channel operation depending on the co-channel rejection capability of the receiving apparatus 1240.

The Bit Error Probability (BEP) is measured at the remote station 123-127. (Other parameters indicating ability of the remote station 123-127 to reject interference may also be used as discussed below). The BEP value is transmitted in the remote station's 123-127 periodic report back to the base station 110, 111, 114. In the GERAN standards, for example, the BEP is represented by the values 0-31 with 0 corresponding to a probability of bit error of 25% and 31 corresponding to a probability of 0.025%. In other words, the higher the BEP, the greater the ability of the remote station 123-127 to reject interference. The BEP is reported as part of an "enhanced measurement report" or "extended report." R99 and later phones may have the capability to report BEP.

Once the burst has been sent, if the BEP of the remote station 123-127 falls below a given threshold, the remote station 123-127 may be considered to be unsuitable for MUROS operations. In simulations, a BEP of at least 25 has been shown to be an advantageous choice of threshold. It is noted that the BEP is derived by sending a burst over the channel and measuring the number of errors occurring in the burst at the remote station 123-127.

However, the BEP on its own may not be an accurate enough measure of the qualities of the remote station 123-127 and the channel, particularly if there is a dramatic variation of error frequency across the burst. It may therefore be preferable to base the MUROS operation decision on the mean BEP taking account of the co-variance of the BEP (CVBEP). These two quantities are mandated by the standards as being present in the report which the remote station 123-127 sends to the base station 110, 111, 114.

Alternatively, the determination of whether the remote station is suitable for co-channel operation could be based on the RxQual parameter returned to the base station 110, 111, 114 by the remote station 123-127 for one SACCH period (0.48 ms). RxQual is a value between 0 and 7 where each value corresponds to an estimated number of bit errors in a number of bursts i.e. the bit error rate (BER, see 3GPP TS 05.08). The higher the bit error rate, the higher is RxQual. Simulations have shown an RxQual of 2 or lower to be an advantageous choice of threshold for MUROS operation.

Alternatively, the parameter RxLev may be used as a selection criterion. RxLev indicates the average signal strength received in dBm. This would also be reported by the remote station 123-127 after the discovery burst. An RxLev of at least −100 dBm has been shown to be advantageous. While particular criteria for MUROS pairing have been described, it would be plain to the skilled person that many other criteria could be used instead or in combination with those identified above.

FIG. 12A of the accompanying drawings is a schematic diagram showing sequences of data frames each containing, or not containing, discovery bursts comprising co-channel data. Three sets of 29 consecutive data frames contain discovery bursts in some of the frames. Time is represented as the horizontal axis on the drawing. Each frame is transmitted during a frame period. Each such frame period is separated from an adjacent frame period by a small vertical line on the drawing. Each frame has a frame index, from 0 to 25, as shown.

A first set of frames 1401 comprises 29 consecutive frames. During a first time interval 1410, corresponding to a frame period of a first frame having index zero (the frame shown as a shaded box labeled zero on the drawing), a discovery burst is transmitted by the transmitting apparatus 1200 on a first channel. The first channel comprises time slot 3 of the first frame. Normal traffic bursts are transmitted during all the remaining seven of the eight time slots of the first frame, i.e. on different channels to the first channel. The transmitting apparatus may transmit the discovery burst based on a signal which the transmitting apparatus has received, the signal indicating a measured characteristic of received data.

For example, a receiving apparatus, which has received data transmitted on the first channel by the transmitting apparatus, may send a signal indicating that the measured characteristic of the received data (e.g. the BEP) has a prescribed value. The measured characteristic may have a prescribed value i.e. it may be within a prescribed range of values or it may be above some value. If the measured characteristic has the prescribed value, then the discovery burst is transmitted.

The received data may be either data which has been transmitted in a normal burst, or data which has been transmitted in a discovery burst.

During a second time interval 1411, corresponding to the next twenty five consecutive frames having indices of 1 to 25 inclusive, normal traffic bursts are transmitted in all eight time slots of each frame, each such frame having no discovery burst. Starting with the next consecutive frame, indexed zero, the process described above for frames 0 to 25 is repeated.

Each time a frame is transmitted a receiving apparatus 1240 receives the frame of data and then measures a characteristic of the data (e.g. BEP). The receiving apparatus 1240 transmits a first signal 1260 indicating the measured characteristic.

The transmitting apparatus 1200 selects, or does not select, the receiving apparatus 1240 for co-channel operation depending on the measured characteristic.

The transmitting apparatus 1200 may select or not select the receiving apparatus 1240 depending on the measured characteristic of a single frame (e.g. frame indexed zero), or depending on the measured characteristic of several frames. The frame(s) for which the characteristic is measured could include, or not include, a frame containing a discovery burst.

If the transmitting apparatus 1200 does not select the receiving apparatus, then the transmitting apparatus 1200 may then transmit, for a prescribed period, only normal traffic bursts and not discovery bursts.

If, on the other hand, the transmitting apparatus 1200 selects the receiving apparatus 1240, then the transmitting apparatus 1200 may again transmit, for a prescribed period, one or more discovery bursts. The transmitting apparatus 1200 may transmit a greater portion of frames containing discovery bursts than just described, as set out below.

In a second set of frames 1402, the process described above for the first set of frames is carried out, except that a discovery burst is transmitted in both the frame indexed 0 and also the frame indexed 1. Thus the transmitting apparatus 1200 transmits a greater proportion of frames containing discovery bursts, compared to the case discussed above for the set of frames 1401.

In a third set of frames 1403, the process described above for the first set of frames 1401 is carried out, except that a discovery burst is transmitted in the frames indexed 0, 1 and 2. Thus the transmitting apparatus 1200 transmits a greater proportion of frames containing discovery bursts, compared to the cases discussed above for the sets of frames 1401 or 1402.

The transmitting apparatus 1200 may continue to increase the proportion of frames containing discovery bursts frames it transmits, in relation to the total number of frames transmitted, until either all frames contain discovery bursts (hence co-channel data), or the receiving apparatus 1240 transmits a signal indicating that the measured characteristic falls outside a predefined range. For example, the BEP may be less than a predefined value.

Multiple frames containing discovery bursts may be transmitted consecutively in groups, as described above. Alternatively, the multiple frames may be transmitted non-consecutively. For example, a discovery burst may be transmitted in frames indexed 0 and 4, or several discovery bursts may be interspersed between sets of normal bursts.

FIG. 12B of the accompanying drawings is a further schematic diagram showing sequences of data frames each containing, or not containing, discovery bursts comprising co-channel data. Such sequences would be suitable for use in a GERAN system.

Each sequence of frames, 1404 to 1408, is a sequence of frames of SACCH data transmitted by the transmitting apparatus in a SACCH period. The sequence of frames 1404 is transmitted in SACCH 1 period (labeled SACCH 1), the sequence of frames 1405 is transmitted in SACCH 2 period (labeled SACCH 2) and so on.

Referring to each SACCH period, the first frame furthest to the left on the figure is labeled S, and is a SACCH signaling frame. The next frame has frame index 48 and contains a discovery burst. The frame with index 48 thus comprises a first time interval during which a discovery burst is transmitted. The first time interval may be considered as the period of the frame containing the discovery burst, or it may be considered as the time of duration of the discovery burst itself, i.e. a time slot. For the sake of simplicity, the first time interval is considered hereinafter as the period of the frame containing the discovery burst.

Frame 49 of the SACCH 1 period and the remainder of frames in SACCH 1 period contain no discovery burst.

During SACCH 2 period 1405, the transmitting apparatus 1200 transmits SACCH data which does not comprise any discovery burst. The receiving apparatus receives the transmitted SACCH data. During a period corresponding to SACCH 2 period, the receiving apparatus 1240 transmits a first signal 1260. The first signal comprises a measured characteristic (e.g. BEP) of data which has been transmitted by transmitting apparatus during SACCH 1 period and received by the receiving apparatus 1240. The first signal comprises a message in a frame corresponding to a frame labeled S (e.g. the frame preceding frame 48 or the frame preceding frame 71).

The transmitting apparatus continues to transmit frames containing normal bursts (not discovery bursts) until, in frame indexed 48 of SACCH 3 period, the transmitting apparatus transmits a frame of data containing a discovery burst. Therefore the interval of time between frame 48 of SACCH 1 period and frame 48 of SACCH 3 period is the second time interval discussed above, during which no discovery bursts are transmitted. The second time interval may be defined as the time interval between the end of the discovery burst in frame 48 of SACCH period 1 and the beginning of the discovery burst in frame 48 of SACCH period 3. Alternatively the second time interval may be defined as the time interval between the end of frame 48 of SACCH period 1 and the beginning of frame 48 of SACCH period 3. A discovery burst is transmitted in both these frames.

During SACCH 3 period 1406, the transmitting apparatus: transmits a frame indexed 48 which contains a discovery burst; then transmits three frames indexed 49, 50 and 51 which contain no discovery burst; and then transmits a frame indexed 52 which contains a discovery burst. The transmitting apparatus then transmits frames containing normal bursts until, in frame indexed 48 of SACCH 5 period 1408, the transmitting apparatus transmits a frame of data containing a discovery burst.

The transmitting apparatus transmits one more frame containing a discovery burst during SACCH 3 period than for SACCH 1 period, depending on the measured characteristic which is transmitted by the receiving apparatus and received by the transmitting apparatus during a period corresponding to SACCH 2 period.

Similarly, the transmitting apparatus transmits, during SACCH 5 period, three frames which each contain a discovery burst i.e. it transmits one more frame containing a discovery burst during SACCH 5 period than for SACCH 3 period, depending on the measured characteristic which is transmitted by the receiving apparatus and received by the transmitting apparatus during a period corresponding to SACCH 4 period.

This process of adding a further frame containing a discovery burst for a later SACCH period may continue until either the measured characteristic of received data no longer meets predefined criteria or until a predetermined proportion of transmitted frames contain discovery bursts (e.g. all transmitted frames).

Table 4 below is a tabular listing of indexed SACCH data frames, for twelve SACCH periods. SACCH 1 to SACCH 8 periods are consecutive and SACCH 21 to SACCH 24 periods are consecutive. SACCH 9 to SACCH 20 periods are not shown, for simplicity. Frames containing a discovery burst are shown as having bold text and borders.

TABLE 4

| | Frame index | | | | | | | | | | | | | | | | | | | | | | | | | |
|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | I | 12 | 13 | 14 | 15 | 16 | 17 | 18 | 19 | 20 | 21 | 22 | 23 | S |
| SACCH 1 | 24 | 25 | 26 | 27 | 28 | 29 | 30 | 31 | 32 | 33 | 34 | 35 | I | 36 | 37 | 38 | 39 | 40 | 41 | 42 | 43 | 44 | 45 | 46 | 47 | S |
| | 48 | 49 | 50 | 51 | 52 | 53 | 54 | 55 | 56 | 57 | 58 | 59 | I | 60 | 61 | 62 | 63 | 64 | 65 | 66 | 67 | 68 | 69 | 70 | 71 | S |
| | 72 | 73 | 74 | 75 | 76 | 77 | 78 | 79 | 80 | 81 | 82 | 83 | I | 84 | 85 | 86 | 87 | 88 | 89 | 90 | 91 | 92 | 93 | 94 | 95 | S |
| | 0 | 1 | 2 | 3 | 4 | 5 | 6 | 7 | 8 | 9 | 10 | 11 | I | 12 | 13 | 14 | 15 | 16 | 17 | 18 | 19 | 20 | 21 | 22 | 23 | S |
| SACCH 2 | 24 | 25 | 26 | 27 | 28 | 29 | 30 | 31 | 32 | 33 | 34 | 35 | I | 36 | 37 | 38 | 39 | 40 | 41 | 42 | 43 | 44 | 45 | 46 | 47 | S |
| | 48 | 49 | 50 | 51 | 52 | 53 | 54 | 55 | 56 | 57 | 58 | 59 | I | 60 | 61 | 62 | 63 | 64 | 65 | 66 | 67 | 68 | 69 | 70 | 71 | S |
| | 72 | 73 | 74 | 75 | 76 | 77 | 78 | 79 | 80 | 81 | 82 | 83 | I | 84 | 85 | 86 | 87 | 88 | 89 | 90 | 91 | 92 | 93 | 94 | 95 | S |
| | 0 | 1 | 2 | 3 | 4 | 5 | 6 | 7 | 8 | 9 | 10 | 11 | I | 12 | 13 | 14 | 15 | 16 | 17 | 18 | 19 | 20 | 21 | 22 | 23 | S |
| SACCH 3 | 24 | 25 | 26 | 27 | 28 | 29 | 30 | 31 | 32 | 33 | 34 | 35 | I | 36 | 37 | 38 | 39 | 40 | 41 | 42 | 43 | 44 | 45 | 46 | 47 | S |
| | 48 | 49 | 50 | 51 | 52 | 53 | 54 | 55 | 56 | 57 | 58 | 59 | I | 60 | 61 | 62 | 63 | 64 | 65 | 66 | 67 | 68 | 69 | 70 | 71 | S |
| | 72 | 73 | 74 | 75 | 76 | 77 | 78 | 79 | 80 | 81 | 82 | 83 | I | 84 | 85 | 86 | 87 | 88 | 89 | 90 | 91 | 92 | 93 | 94 | 95 | S |
| | 0 | 1 | 2 | 3 | 4 | 5 | 6 | 7 | 8 | 9 | 10 | 11 | I | 12 | 13 | 14 | 15 | 16 | 17 | 18 | 19 | 20 | 21 | 22 | 23 | S |
| SACCH 4 | 24 | 25 | 26 | 27 | 28 | 29 | 30 | 31 | 32 | 33 | 34 | 35 | I | 36 | 37 | 38 | 39 | 40 | 41 | 42 | 43 | 44 | 45 | 46 | 47 | S |
| | 48 | 49 | 50 | 51 | 52 | 53 | 54 | 55 | 56 | 57 | 58 | 59 | I | 60 | 61 | 62 | 63 | 64 | 65 | 66 | 67 | 68 | 69 | 70 | 71 | S |
| | 72 | 73 | 74 | 75 | 76 | 77 | 78 | 79 | 80 | 81 | 82 | 83 | I | 84 | 85 | 86 | 87 | 88 | 89 | 90 | 91 | 92 | 93 | 94 | 95 | S |
| | 0 | 1 | 2 | 3 | 4 | 5 | 6 | 7 | 8 | 9 | 10 | 11 | I | 12 | 13 | 14 | 15 | 16 | 17 | 18 | 19 | 20 | 21 | 22 | 23 | S |
| SACCH 5 | 24 | 25 | 26 | 27 | 28 | 29 | 30 | 31 | 32 | 33 | 34 | 35 | I | 36 | 37 | 38 | 39 | 40 | 41 | 42 | 43 | 44 | 45 | 46 | 47 | S |
| | 48 | 49 | 50 | 51 | 52 | 53 | 54 | 55 | 56 | 57 | 58 | 59 | I | 60 | 61 | 62 | 63 | 64 | 65 | 66 | 67 | 68 | 69 | 70 | 71 | S |
| | 72 | 73 | 74 | 75 | 76 | 77 | 78 | 79 | 80 | 81 | 82 | 83 | I | 84 | 85 | 86 | 87 | 88 | 89 | 90 | 91 | 92 | 93 | 94 | 95 | S |
| | 0 | 1 | 2 | 3 | 4 | 5 | 6 | 7 | 8 | 9 | 10 | 11 | I | 12 | 13 | 14 | 15 | 16 | 17 | 18 | 19 | 20 | 21 | 22 | 23 | S |
| SACCH 6 | 24 | 25 | 26 | 27 | 28 | 29 | 30 | 31 | 32 | 33 | 34 | 35 | I | 36 | 37 | 38 | 39 | 40 | 41 | 42 | 43 | 44 | 45 | 46 | 47 | S |
| | 48 | 49 | 50 | 51 | 52 | 53 | 54 | 55 | 56 | 57 | 58 | 59 | I | 60 | 61 | 62 | 63 | 64 | 65 | 66 | 67 | 68 | 69 | 70 | 71 | S |
| | 72 | 73 | 74 | 75 | 76 | 77 | 78 | 79 | 80 | 81 | 82 | 83 | I | 84 | 85 | 86 | 87 | 88 | 89 | 90 | 91 | 92 | 93 | 94 | 95 | S |
| | 0 | 1 | 2 | 3 | 4 | 5 | 6 | 7 | 8 | 9 | 10 | 11 | I | 12 | 13 | 14 | 15 | 16 | 17 | 18 | 19 | 20 | 21 | 22 | 23 | S |
| SACCH 7 | 24 | 25 | 26 | 27 | 28 | 29 | 30 | 31 | 32 | 33 | 34 | 35 | I | 36 | 37 | 38 | 39 | 40 | 41 | 42 | 43 | 44 | 45 | 46 | 47 | S |
| | 48 | 49 | 50 | 51 | 52 | 53 | 54 | 55 | 56 | 57 | 58 | 59 | I | 60 | 61 | 62 | 63 | 64 | 65 | 66 | 67 | 68 | 69 | 70 | 71 | S |
| | 72 | 73 | 74 | 75 | 76 | 77 | 78 | 79 | 80 | 81 | 82 | 83 | I | 84 | 85 | 86 | 87 | 88 | 89 | 90 | 91 | 92 | 93 | 94 | 95 | S |
| | 0 | 1 | 2 | 3 | 4 | 5 | 6 | 7 | 8 | 9 | 10 | 11 | I | 12 | 13 | 14 | 15 | 16 | 17 | 18 | 19 | 20 | 21 | 22 | 23 | S |
| SACCH 8 | 24 | 25 | 26 | 27 | 28 | 29 | 30 | 31 | 32 | 33 | 34 | 35 | I | 36 | 37 | 38 | 39 | 40 | 41 | 42 | 43 | 44 | 45 | 46 | 47 | S |
| | 48 | 49 | 50 | 51 | 52 | 53 | 54 | 55 | 56 | 57 | 58 | 59 | I | 60 | 61 | 62 | 63 | 64 | 65 | 66 | 67 | 68 | 69 | 70 | 71 | S |
| | 72 | 73 | 74 | 75 | 76 | 77 | 78 | 79 | 80 | 81 | 82 | 83 | I | 84 | 85 | 86 | 87 | 88 | 89 | 90 | 91 | 92 | 93 | 94 | 95 | S |

TABLE 4-continued

| | ... | | | | | | | | | | | | ... | | | | | | | | | | | | ... |
|---|---|---|---|---|---|---|---|---|---|---|---|---|---|---|---|---|---|---|---|---|---|---|---|---|---|
| SACCH 21 | 0 | 1 | 2 | 3 | 4 | 5 | 6 | 7 | 8 | 9 | 10 | 11 | I | 12 | 13 | 14 | 15 | 16 | 17 | 18 | 19 | 20 | 21 | 22 | 23 | S |
| | 24 | 25 | 26 | 27 | 28 | 29 | 30 | 31 | 32 | 33 | 34 | 35 | I | 36 | 37 | 38 | 39 | 40 | 41 | 42 | 43 | 44 | 45 | 46 | 47 | S |
| | 48 | 49 | 50 | 51 | 52 | 53 | 54 | 55 | 56 | 57 | 58 | 59 | I | 60 | 61 | 62 | 63 | 64 | 65 | 66 | 67 | 68 | 69 | 70 | 71 | S |
| | 72 | 73 | 74 | 75 | 76 | 77 | 78 | 79 | 80 | 81 | 82 | 83 | I | 84 | 85 | 86 | 87 | 88 | 89 | 90 | 91 | 92 | 93 | 94 | 95 | S |
| SACCH 22 | 0 | 1 | 2 | 3 | 4 | 5 | 6 | 7 | 8 | 9 | 10 | 11 | I | 12 | 13 | 14 | 15 | 16 | 17 | 18 | 19 | 20 | 21 | 22 | 23 | S |
| | 24 | 25 | 26 | 27 | 28 | 29 | 30 | 31 | 32 | 33 | 34 | 35 | I | 36 | 37 | 38 | 39 | 40 | 41 | 42 | 43 | 44 | 45 | 46 | 47 | S |
| | 48 | 49 | 50 | 51 | 52 | 53 | 54 | 55 | 56 | 57 | 58 | 59 | I | 60 | 61 | 62 | 63 | 64 | 65 | 66 | 67 | 68 | 69 | 70 | 71 | S |
| | 72 | 73 | 74 | 75 | 76 | 77 | 78 | 79 | 80 | 81 | 82 | 83 | I | 84 | 85 | 86 | 87 | 88 | 89 | 90 | 91 | 92 | 93 | 94 | 95 | S |
| SACCH 23 | 0 | 1 | 2 | 3 | 4 | 5 | 6 | 7 | 8 | 9 | 10 | 11 | I | 12 | 13 | 14 | 15 | 16 | 17 | 18 | 19 | 20 | 21 | 22 | 23 | S |
| | 24 | 25 | 26 | 27 | 28 | 29 | 30 | 31 | 32 | 33 | 34 | 35 | I | 36 | 37 | 38 | 39 | 40 | 41 | 42 | 43 | 44 | 45 | 46 | 47 | S |
| | 48 | 49 | 50 | 51 | 52 | 53 | 54 | 55 | 56 | 57 | 58 | 59 | I | 60 | 61 | 62 | 63 | 64 | 65 | 66 | 67 | 68 | 69 | 70 | 71 | S |
| | 72 | 73 | 74 | 75 | 76 | 77 | 78 | 79 | 80 | 81 | 82 | 83 | I | 84 | 85 | 86 | 87 | 88 | 89 | 90 | 91 | 92 | 93 | 94 | 95 | S |
| SACCH 24 | 0 | 1 | 2 | 3 | 4 | 5 | 6 | 7 | 8 | 9 | 10 | 11 | I | 12 | 13 | 14 | 15 | 16 | 17 | 18 | 19 | 20 | 21 | 22 | 23 | S |
| | 24 | 25 | 26 | 27 | 28 | 29 | 30 | 31 | 32 | 33 | 34 | 35 | I | 36 | 37 | 38 | 39 | 40 | 41 | 42 | 43 | 44 | 45 | 46 | 47 | S |
| | 48 | 49 | 50 | 51 | 52 | 53 | 54 | 55 | 56 | 57 | 58 | 59 | I | 60 | 61 | 62 | 63 | 64 | 65 | 66 | 67 | 68 | 69 | 70 | 71 | S |
| | 72 | 73 | 74 | 75 | 76 | 77 | 78 | 79 | 80 | 81 | 82 | 83 | I | 84 | 85 | 86 | 87 | 88 | 89 | 90 | 91 | 92 | 93 | 94 | 95 | S |

During SACCH 1 period, the transmitting apparatus transmits frames of which frame 48 contains a discovery burst and the remaining frames do not contain a discovery burst.

During SACCH 2 period, the measured characteristic of the data transmitted in the SACCH 1 period is transmitted by the receiving apparatus and received by the transmitting apparatus during a period corresponding to SACCH 4 period. The measured characteristic meets the predefined criteria.

Because the measured characteristic meets the predefined criteria, during SACCH 3 period, the transmitting apparatus transmits frames of which frame 48 and frame 52 contain a discovery burst and the remaining frames do not contain a discovery burst. The process of adding frames containing discovery bursts continues, as shown for the subsequent SACCH 4 to 13 periods.

Each time the transmitting apparatus receives the measured characteristic, the transmitting apparatus selects, or does not select, the receiving apparatus for co-channel operation and, depending on the measured characteristic, the transmitting apparatus may transmit a greater proportion of frames containing discovery bursts.

It can be seen from the figure that during SACCH 13 period, alternate frames contain discovery bursts.

A final selection of the receiving apparatus results in the transmitting apparatus transmitting co-channel data during a predetermined proportion of the transmitted frames, for example all of the frames or a predetermined maximum number of frames.

After a first receiving apparatus is selected for co-channel operation, a second receiving apparatus may be selected using the procedure described above except that, to select the second receiving apparatus, discovery bursts are transmitted on the second channel, the second channel being for the data intended for the second receiving apparatus. Described above is the transmitting of discovery bursts on the first channel to select the first receiving apparatus.

Alternatively, both the first and second receiving apparatus may be selected substantially simultaneously, whereby each of the first and second data are transmitted on each channel.

Testing a Traffic Channel

Described below are methods and apparatus which illustrate how the above features may be applied to a pair of remote stations 123-127 operating using MUROS/VAMOS in a GSM or GERAN communications system.

The network may evaluate a plurality of traffic channel (TCH) candidates which two or more remote stations 123-127 may potentially use as a MUROS TCH. The selected TCH may be the TCH currently in use by a pair of users (for example when the users are served by different cells or sectors), or it may be an unused TCH that is known to have good metrics (see below). Subsequently, one of the remote stations 123-127 may be moved onto another TCH which is already in use. To increase the capacity of a cell, the network may consider a number of current remote stations 123-127 to potentially be operated in MUROS mode. Many pairs of remote stations 123-127 may be tested in parallel, possibly by the base station radio management entity. The network may enable the extended report and rely on the remote stations 123-127 reporting their BEP if they are R99 or later. If the remote stations 123-127 are pre-R99, the network may rely on the remote stations 123-127 transmitting signals indicating Rxqual and RxLev values.

Before MUROS is fully utilized on a TCH (e.g. during every or most traffic data frames), the TCH may be tested as follows. A discovery burst is transmitted by the base station 110, 111, 114 in place of a normal traffic (e.g. speech) burst. If the report returned by the remote station 123-127 to the base station 110, 111, 114 (e.g., enhanced measurement report, or extended report) indicates that the remote station 123-127 can sufficiently reject the interference caused by the co-channel signal, more discovery bursts can be sent. In one example, the discovery bursts may be sent at regular intervals, such as every SACCH period. This burst may be referred to as a MUROS discovery burst. The discovery bursts can vary in following aspects with regards to the normal (non-discovery) traffic bursts.

The amplitudes of the discovery bursts, may vary. The discovery bursts may consist of a few bits/symbols of a burst to half a burst or a whole burst.

The amount of discovery bursts sent may range from one to a few, and from non-consecutive discovery bursts to consecutive bursts.

The modulation types of the discovery burst may be different to the modulation type of the normal traffic bursts.

The modulation types of the discovery burst may vary (i.e., QPSK, alpha-QPSK, linear sum of two GMSK and high order modulations, such as 8PSK, 16QAM).

If discovery bursts are added gradually the performance of remote stations 123-127 is not degraded unacceptably during calls. It is preferable to determine a remote station's 123-127 MUROS capability without disturbing the communication. A GERAN system can make this determination because the system was designed to have some margin to combat fading since the system may not have either a fast, or a fine-step, feedback loop for physical layer power control. For a DARP-enabled remote station, such a margin is large enough that it is possible to use traffic bursts for transmitting discovery bursts to the DARP remote station, for the purpose of setting up another call.

Tables 4 and 5 below show listings of consecutive transmitted frames of data transmitted by the transmitting apparatus on a first channel (channel 1) and a second channel (channel 2). The frames are indexed from 0 to 25, the sequence of frame indices then repeating from 0 to 6.

TABLE 5

| Frame index | Channel 1 | Channel 2 |
|---|---|---|
| 0 | D1&D2 | D1&D2 |
| 1 | D1 | D2 |
| 2 | D1 | D2 |
| 3 | D1 | D2 |
| 4 | D1 | D2 |
| 5 | D1 | D2 |
| 6 | D1 | D2 |
| 7 | D1 | D2 |
| 8 | D1&D2 | D1&D2 |
| 9 | D1&D2 | D1&D2 |
| 10 | D1 | D2 |
| 11 | D1 | D2 |
| 12 | D1 | D2 |
| 13 | D1 | D2 |
| 14 | D1 | D2 |
| 15 | D1 | D2 |
| 16 | D1&D2 | D1&D2 |
| 17 | D1&D2 | D1&D2 |
| 18 | D1&D2 | D1&D2 |
| 19 | D1 | D2 |
| 20 | D1 | D2 |
| 21 | D1 | D2 |
| 22 | D1 | D2 |
| 23 | D1 | D2 |
| 24 | D1 | D2 |
| 25 | D1 | D2 |
| 0 | D1&D2 | D1&D2 |
| 1 | D1&D2 | D1&D2 |
| 2 | D1&D2 | D1&D2 |
| 3 | D1&D2 | D1&D2 |
| 4 | D1&D2 | D1&D2 |
| 5 | D1&D2 | D1&D2 |
| 6 | D1&D2 | D1&D2 |

TABLE 4

| Frame index | Channel 1 | Channel 2 |
|---|---|---|
| 0 | D1&D2 | D2 |
| 1 | D1 | D2 |
| 2 | D1 | D2 |
| 3 | D1 | D2 |
| 4 | D1 | D2 |
| 5 | D1 | D2 |
| 6 | D1 | D2 |
| 7 | D1 | D2 |
| 8 | D1&D2 | D2 |
| 9 | D1&D2 | D2 |
| 10 | D1 | D2 |
| 11 | D1 | D2 |
| 12 | D1 | D2 |
| 13 | D1 | D2 |
| 14 | D1 | D2 |
| 15 | D1 | D2 |
| 16 | D1&D2 | D2 |
| 17 | D1&D2 | D2 |
| 18 | D1&D2 | D2 |
| 19 | D1 | D2 |
| 20 | D1 | D2 |
| 21 | D1 | D2 |
| 22 | D1 | D2 |
| 23 | D1 | D2 |
| 24 | D1 | D2 |
| 25 | D1 | D2 |
| 0 | D1&D2 | D2 |
| 1 | D1&D2 | D2 |
| 2 | D1&D2 | D2 |
| 3 | D1&D2 | D2 |
| 4 | D1&D2 | D2 |
| 5 | D1&D2 | D2 |
| 6 | D1&D2 | D2 |

Referring to the second column of the tables above, headed channel 1, during a first time interval corresponding to frame indexed zero, a first data D1 comprising a first data sequence, and a second (co-channel) data D2 comprising a second data sequence, are transmitted on a first channel (channel 1). During the first time interval, the second data is also transmitted on a second channel (channel 2).

The transmitted frames of data are received by the receiving apparatus 1240. The receiving apparatus 1240 measures a characteristic of received data, based on some or all received frame(s), and transmits a signal indicating the characteristic. The signal is received by the transmitting apparatus 1200.

During a second time interval corresponding to frames indexed 1 to 7, the first data D1 (but not the second data D2) is transmitted on the first channel (channel 1) and the second data is transmitted on the second channel (channel 2). Optionally the second data is only transmitted on channel 2 during the first time interval. This would result in loss of a portion of the second data on the second channel but it may be a simpler implementation. The transmitted frames may contain no co-channel data either depending, or not depending on the characteristic.

Depending on the characteristic (e.g. if the measured BEP is acceptable), during a third time interval corresponding to frames indexed 8 and 9, the first data D1 and the second (co-channel) data D2 are transmitted by the transmitting apparatus 1200 on the first channel (channel 1), and the second data is transmitted on a second channel (channel 2). Optionally the second data is only transmitted on channel 2 during the first time interval.

During a fourth time interval corresponding to frames indexed 10 to 15, the first data D1 (but not the second data D2) is transmitted on the first channel (channel 1) and the second data is transmitted on the second channel (channel 2).

During a fifth time interval corresponding to frames indexed 16 to 18, the first data D1 and the second (co-channel)

data D2 are transmitted on the first channel (channel 1), and the second data is transmitted on a second channel (channel 2).

During a sixth time interval corresponding to frames indexed 19 to 25, the first data D1 (but not the second data D2) is transmitted on the first channel (channel 1) and the second data is transmitted on the second channel (channel 2).

During a seventh time interval corresponding to frames indexed 0 to 6, the first data D1 and the second (co-channel) data D2 are transmitted on the first channel (channel 1), and the second data is transmitted on a second channel (channel 2).

Thus, depending on the measured characteristic of received data, the second data is either sent, or not sent, on the same channel as the first data. Additionally, as shown in table 4, the second data is sent on the same channel as the first data during a time interval which depends on the measured characteristic of received data. For example, if the BEP reported for received frames 0 to 7 of table 4 (or for only frame 0) is within a predetermined range, then both first and second (co-channel) data are transmitted in frames 8 and 9. The time interval for sending co-channel data (i.e. the number of frames in this example) may be set to increase with time so long as the measured characteristic remains within the predetermined range and until a target proportion of frames contain co-channel data.

Thus, Table 4 shows a listing of consecutive transmitted frames of data in which: a portion of the frames transmitted on channel 1 contain discovery bursts i.e. co-channel data (first data D1 for a first receiving apparatus and second data D2 for a second receiving apparatus); and all of the frames transmitted on channel 2 contain only the second data D2. The discovery bursts are used, as described above, to select, or not select, the first receiving apparatus.

Table 5 shows a listing of consecutive transmitted frames of data in which: a portion of the frames transmitted on channel 1 contain discovery bursts and all of the frames transmitted on channel 2 contain only the second data D2; and additionally a portion of the frames transmitted on channel 2 contain discovery bursts. For simplicity, the discovery bursts are shown as being transmitted in the same frames for both channel 1 and channel 2, however the discovery bursts may be transmitted in different frames for channel 2 than for channel 1.

The discovery bursts as shown in table 5 are used as described above: to select or not select the first receiving apparatus 1240; and additionally to select or not select a second receiving apparatus 1240.

FIG. 13 of the accompanying drawings is a flow diagram of a method of selecting a receiving apparatus 1240 for co-channel operation. A first data sequence is selected for first data (block 1601). The first data sequence comprises a first training sequence. A first power level is determined for transmitting the first data (block 1602). A second data sequence is selected for second data (block 1603). The second data sequence comprises a second training sequence. A second power level is determined for transmitting the second data (block 1604). The equalizer 1105 of the receiving apparatus 1240 can use the first training sequence to distinguish the first signal from the second signal, and can use the second training sequence to distinguish the second signal from the first signal.

The first and second data are transmitted on a first channel at the respective first and second power levels (block 1605). The transmitted data is received in the receiving apparatus 1240 (block 1606) and a characteristic of the data, BEP, is measured (block 1607). The receiving apparatus 1240 transmits a signal indicating the BEP (block 1608). The transmitting apparatus 1200 receives the signal (block 1609). A determination is made (block 1610) of whether the measured characteristic meets predefined criteria, for example, does the BEP fall within a predefined limit? If the measured characteristic meets the predefined criteria, the receiving apparatus 1240 is selected for co-channel operation (block 1611). If the measured characteristic does not meet the predefined criteria, the receiving apparatus 1240 is not selected for co-channel operation (block 1612) but is selected for single channel operation.

FIG. 14 of the accompanying drawings is a further flow diagram of a method of selecting a receiving apparatus 1240 for co-channel operation. In this flow diagram, the steps are the same as those shown in FIG. 13, except that in block 1707, a characteristic of the first and second data (not only the first data) is measured. In block 1607 of FIG. 13, a characteristic of only the first data is measured.

Selection of Speech Codec

Another consideration is that the CCI rejection of a DARP capable remote station 123-127 will vary depending on which speech codec is used. For example, the ratio of transmitted powers for two paired remote stations 123-127 may also be affected by the selection of codecs. For example, a remote station 123-127 using a low codec rate (such as AHS 4.75) would be able to still operate while receiving less power (such as 2 dB) than if the remote station 123-127 used a higher codec rate (such as AHS5.9), due to the coding gain. To find the better codecs for a pair of remote stations 123-127, a lookup table may be used to find suitable codecs for the pair. Thus, the network may assign different downlink power levels according to a) the distance from the base station 110, 111, 114 to the remote station 123-127, and b) the codecs used.

FIG. 15 of the accompanying drawings is a graph of FER performance under different levels of signal-to-noise ratio (Eb/No) for different codecs.

FIG. 16 of the accompanying drawings is a graph of FER performance under different levels of carrier to interference (C/I) for different codecs.

It may be better if the network finds co-channel users who are at a similar distance from the base station 110, 111, 114. This is due to the performance limitation of CCI rejection. If one signal is stronger compared to a weaker signal, the weaker signal may not be detected due to the interference to the weaker signal by the stronger signal, if the ratio of powers between weaker and stronger signal is too great. Therefore, the network may consider the distance from the base station 110, 111, 114 to new users when assigning co-channels and co-timeslots. The following described procedures would allow the network to minimize the interference to other cells.

Remote stations 123-127 may be selected as candidates for MUROS operation based on, for example, the RxLev reported by each remote station 123-127, and a traffic assignment (TA) made to the candidate MUROS remote stations 123-127. The network can dynamically determine possible MUROS pairing groups of remote stations 123-127. For example, if a non-DARP capable remote station 123-127 is further away from a serving base station 110, 111, 114 than a DARP capable remote station 123-127, it may be possible to pair the two remote stations 123-127 as described above, such that the transmitted power levels are different for the two remote stations 123-127.

To dynamically pair groups of remote stations 123-127, the network may maintain a dynamic database of the above information (e.g. range, RXLEV, etc.) for remote stations 123-127 in the cell and prepare to make changes to the pairings when the RF environment changes. These changes include: new pairing, de-pairing and re-pairing either both of a pair of remote stations 123-127, or just one of them. These changes are determined by: changes of power ratios between the paired MUROS remote stations 123-127; and also changes of codecs used by each MUROS caller.

As stated above, the metrics RXqual/BEP and RxLev may be used to measure the effect of the discovery bursts. For those discovery bursts that have an associated increase of Rxqual or decrease of BEP (i.e. a degraded quality of received data at the remote station 123-127), the remote station 123-127 at that moment may not be suitable for MUROS on the TCH candidate on which the discovery bursts are transmitted. On the other hand, if the BEP/Rxqual for the discovery burst is not much worse than for the normal bursts, then MUROS may be suitable for that candidate TCH.

For a 0 dB MUROS discovery burst (in which the co-channel data is transmitted at the same power level or amplitude as the normal traffic data), the RxLev metric could have a 3 dB increase during the SACCH period when the discovery bursts are sent. Such a test may also be used with different codecs. For example, using codec ASH5.9 in a DARP capable phone 123-127, and assigning 0 dB MUROS power ratio between the two MUROS signals in the discovery burst, would cause minimal degradation of the Rxqual/BEP metrics. On the other hand, a non-DARP capable phone 123-127, in the same conditions, may indicate a drop in the Rxqual metric even after only one discovery burst has been transmitted. Also, for a discovery burst which has a duration of one SACCH period (0.48 sec), the RxLev metric may be 3 dB higher (due to 0 dB co-channel power ratio) than for the normal, non-discovery bursts.

For those remote stations 123-127 that are DARP capable, further information about their capability to pair with non-DARP capable and DARP capable phones 123-127 may be obtained. This information may include: the power ratio between the co-TCH users; the codecs that can be applied to each co-TCH users in their condition; or the training sequence to be used. Hence, a co-TCH can be adapted to wide range of MUROS remote stations 123-127.

It is possible to obtain a sustainable power ratio between two remote stations 123-127 which can be paired on a MUROS co-TCH by a step by step increase in power of signal for the prospective co-TCH user and by gauging a suitable ratio where the metrics indicate an acceptable performance. For those remote stations 123-127 where the power ratio is below a certain value, say −4 dB, it is possible to pair that remote station 123-127 with a non-DARP capable phone 123-127. For those remote stations 123-127 where the power ratio is around 0 dB, then a DARP capable remote station 123-127 can be used to pair with another DARP remote station.

For those remote stations 123-127 that are suitable or have been on MUROS calls, similar estimations apply so that the network may switch the remote stations 123-127 back to normal operation when conditions indicate to do so. The embodiments described herein and in the accompanying drawings work with legacy remote stations 123-127, as there is nothing new that a remote station 123-127 will do when paired with a MUROS capable remote station 123-127. The legacy DARP remote station 123-127 just operates as if in normal operation without realizing that a smart network is using its DARP capability for good capacity gain in the cell.

Description of Prescribed Discovery Bursts

An ongoing voice call is kept alive and maintained by a SACCH. The base station 110, 111, 114 relies on the remote station's 123-127 SACCH report containing such information as, in one example, the value of RXQual of a remote station 123-127, to decide what to do next. Each SACCH period/frame is 104 frames and 480 ms long. Enhanced power control (EPC) can reduce the period/frame length to 26 frames and 120 ms long. The remote station 123-127 is used to report previous SAACH period performance, so there is 480 ms or 120 ms delay. A call is dropped if a number of SACCH reports are missing. An operator may set the value or threshold of missing SAACH reports where a call is dropped. For example, losing 25 SACCH frames is likely to drop the call. On the other hand, a call won't be dropped if one SACCH frame is lost. A method may be used to make a call drop decision.

Using EPC to determine if a remote terminal 123-127 is MUROS capable may be quicker because its period/frame length is shorter. Both EPC and the normal SACCH frame can be used by the network when sending discovery bursts to determine if a remote terminal 123-127 is MUROS capable. Below are some examples of sending discovery bursts during a normal SACCH period to describe the points of operation. The same method may be applied to an EPC case.

In order not to cause an unnecessary dropped call, the discovery bursts may be applied lightly. i.e., one discovery burst per SACCH period, to start with. Thus, at the beginning, only during 1 of the 104 frames in a SAACH period will a discovery burst be sent. The number of frames when discovery bursts are sent is then ramped up. MUROS may be applied to those remote stations 123-127 that have no problem handling discovery bursts sent during all SACCH frames (104) in a SACCH period. In one example, it may be helpful to send discovery bursts to multiple SACCH frames to make sure the remote station 123-127 is good enough for MUROS operation.

FIG. 17 is a flow diagram of a method of progressively increasing the number of discovery bursts within a SACCH period for a series of SACCH periods. The method is low risk and avoids bad voice quality and dropped calls.

Initially a base station 110, 111, 114 selects MUROS candidate remote stations from remote stations that report good Rxqual values, e.g. Rxqual=0 (step 1805 of FIG. 17).

The base station's transmitting apparatus sends just one discovery burst during one frame of the 104 frame SAACH period (step 1810 of FIG. 17). For example one discovery burst is sent during TCH frame 48. The reasons to start from frame 48 are: it is the first burst of a speech block; and the base station 110, 111, 114 may need some time to process the last SACCH data received from the remote station. Frame 48 is near the middle of the SAACH period. This gives the base station 110, 111, 114 enough time to analyze the remote station's 123-127 report during the last SACCH period, before the next SAACH period starts.

During the next SACCH period, the base station 110, 111, 114 receives a report of the RxQual of the remote station 123-127 during the last SACCH period (step 1815). Other measured characteristics such as BEP or RxLev may be identified in the report. No discovery bursts are sent in the next SACCH period when a reference RxQual is reported to the base station 110, 111, 114.

Next, the base station 110, 111, 114 determines if the RXQual is acceptable (step 1817). If the Rxqual is acceptable (for example, Rxqual<=1) the base station 110, 111, 114 transmits two discovery bursts during the next SAACH period (step 1820). For example, discovery bursts may be sent during TCH frames 48 and 52. This procedure avoids sending two discovery bursts in one speech block (4 frames) at an early stage. If the discovery bursts cause speech data errors on this TCH, the speech quality is impacted less if the two discovery bursts are not sent in one speech block.

The next SACCH period (SACCH (N+1) period) is used to report RxQual of the remote station 123-127 for this SACCH period (SACCH N period) to the base station 110, 111, 114 (step 1825). If the RxQual is not acceptable, no more discovery bursts are sent (step 1822).

A progressively increasing number of discovery bursts are transmitted by the base station 110, 111, 114 to the remote station 123-127 during a SAACH period until a threshold is reached. In one example, the threshold is that the first burst of all 24 speech blocks in a SACCH frame comprises a discovery burst. In another example, discovery bursts are transmitted during all 104 frames of a SAACH period. A possible sequence of steps for transmitting discovery bursts is: 1:2:4:8:24, which is 480×2×5=4800 msec. Therefore the first stage needs about 5 seconds to determine the good MUROS candidates which will be put on a short list.

During the next SACCH period, the base station 110, 111, 114 receives a report of the RxQual of the remote station 123-127 during the last SACCH period (step 1825).

A determination is made of whether the RxQual is still acceptable (step 1828) If the remote station's 123-127 Rxqual is still acceptable, then a check is made of whether the threshold reached concerning the maximum number of discovery bursts to transmit during a SAACH (step 1830). If RxQual is not acceptable, no more discovery bursts are transmitted (step 1832). If the threshold is reached, the proportion of frames containing discovery bursts is no longer increased. (step 1835). If the threshold is not reached, the number of discovery bursts in one SAACH period is increased and the process returns to step 1825, to await the next reporting of RXQual. (step 1840 of FIG. 17).

In one example, for those remote stations 123-127 that do not have Rxqual<3, discovery is stopped, and they are dropped from the short list of MUROS capable remote stations 123-127. The reference SACCH period may be a good reference period in which to compare a remote station's 123-127 Rxqual with a remote station's 123-127 Rxqual during a SAACH period in which discovery bursts were sent. One reason is that the environment of the remote station 123-127 may change such that the RxQual deteriorates independently of any discovery bursts. That may happen when remote station 123-127 receives strong interference from other remote stations 123-127 or the remote station's signal experiences bad multipath fading.

The ¼ discovery burst rate (one discovery burst transmitted every 4$^{th}$ frame) shown in SAACH period #11 is generally a good indication of MUROS candidates. From there, the base station 110, 111, 114 may transmit twice as many discovery bursts in SACCH period #13 (one discovery burst transmitted every 2nd frame), or the base station 110, 111, 114 may change the power level of the discovery bursts.

FIG. 18 of the accompanying drawings shows an apparatus for operating in a multiple access communication system to produce first and second signals sharing a single channel. A first data source 4001 and a second data source 4002 (for a first and a second remote station 123-127) produce first data 4024 and second data 4025 for transmission. A sequence generator 4003 generates a first sequence 4004 and a second sequence 4005. A first combiner 4006 combines the first sequence 4004 with the first 4024 data to produce first combined data 4008. A second combiner 4007 combines the second sequence 4005 with the second data 4025 to produce second combined data 4009.

The first and second combined data 4008, 4009 are input to a transmitter modulator 4010 for modulating both the first and the second combined data 4008, 4009 using a first carrier frequency 4011 and a first time slot 4012. In this example, the carrier frequency may generated by an oscillator 4021. The transmitter modulator outputs a first modulated signal 4013 and a second modulated signal 4014 to a combiner 4022 which combines the modulated signals 4013, 4014 to provide a combined signal for transmission. A RF front end 4015, connected to the combiner 4022, processes the combined signal by upconverting it from baseband to an RF (radio frequency) frequency. The combined upconverted signal is sent to antenna 4016 where the upconverted signal is transmitted via electromagnetic radiation. The combiner 4022 may be a part of either the transmitter modulator 4010 or the RF front end 4015 or a separate device.

Having thus described the invention by reference to the embodiment shown in the accompanying drawings it is to be well understood that the embodiments in question are by way of example only and that modifications and variations such as will occur to those possessed with appropriate knowledge and skills may be made without departure from the spirit and scope of the invention as set forth in the appended claims and equivalents thereof.

The methods described herein may be implemented by various means. For example, these methods may be implemented in hardware, firmware, software, or a combination thereof. For a hardware implementation, functions may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, DVD, Blu-Ray disc, or any other form of storage medium. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The invention claimed is:

1. A transmitting apparatus comprising:
a transmitter for transmitting a first set of frames comprising a first frame with a first time interval during which a discovery burst is transmitted containing a first data and a second data at respective first and second power levels on a first channel comprising a single frequency and time slot;
a receiver for receiving a first signal, the first signal indicating a measured characteristic of received;
a selector, responsive to the received first signal, configured to select a receiving apparatus for co-channel operation depending on the measured characteristic; and
wherein the transmitter is configured to, depending on the measured characteristic, transmit a second set of frames that comprise a greater proportion of frames containing discovery bursts relative to the first frame.

2. The transmitting apparatus of claim 1, wherein the first data comprises a first predefined sequence of data; and the second data comprises a second predefined sequence of data.

3. The transmitting apparatus of claim 1, wherein the transmitting apparatus is configured:
to transmit the first and second data on the first channel during a first time interval if the measured characteristic is within a predetermined range; and
to transmit the first data on the first channel and the second data on a second channel during a second time interval.

4. The transmitting apparatus of claim 3 wherein the transmitting apparatus is configured to determine the first and second time intervals depending on the measured characteristic.

5. The transmitting apparatus of claim 1, wherein the transmitter is configured to determine said first and second power levels depending on the measured characteristic.

6. The transmitting apparatus of claim 1 wherein the received data is the first data.

7. The transmitting apparatus of claim 2, wherein the first and second predefined sequences are training sequences.

8. The transmitting apparatus of claim 3, wherein the measured characteristic is within the predetermined range when a RxQual is less than 2.

9. The transmitting apparatus of claim 3, wherein the measured characteristic is within the predetermined range when a bit error probability is greater than or equal to 25.

10. The transmitting apparatus of claim 3, wherein the second channel comprises a different frequency than the first channel.

11. The transmitting apparatus of claim 3, wherein the second channel comprises a different time slot than the first channel.

12. The transmitting apparatus of claim 3, wherein the second channel comprises the same frequency as, but a different time slot than, the first channel.

13. The transmitting apparatus of claim 1, wherein the transmitting apparatus is configured: to receive a second signal indicating an interference rejection capability of said receiving apparatus; and to further select the receiving apparatus depending on the second signal.

14. A method of selecting a receiving apparatus for co-channel operation, the method comprising:
transmitting, via a transmitting apparatus, a first set of frames comprising a first frame with a first frame time interval during which a discovery burst is transmitted containing a first and a second data at respective first and second power levels on a first channel comprising a single frequency and time slot;
receiving, at the transmitting apparatus, a first signal, wherein the first signal indicates a measured characteristic of received data; and
the transmitting apparatus responding to the received first signal by selecting a receiving apparatus for co-channel operation depending on the measured characteristic; and
the transmitting apparatus transmitting to the selected receiving apparatus, depending on the measured characteristic, a second set of frames that comprise a greater proportion of frames containing discovery bursts relative to the first frame.

15. The method of claim 14, wherein the first data comprises a first predefined sequence of data; and the second data comprises a second predefined sequence of data.

16. The method of claim 14, comprising:
transmitting the first and second data on the first channel during a first time interval if the measured characteristic is within a predetermined range; and
transmitting the first data on the first channel and the second data on a second channel during a second time interval.

17. The method of claim 16 further comprising: determining the first and second time intervals depending on the measured characteristic.

18. The method of claim 14, further comprising:
determining the first and second power levels for transmission of said first and second data depending on the measured characteristic.

19. The method of claim 14, whereby the received data comprises the first data.

20. The method of claim 15, wherein the first and second predefined sequences of data are training sequences.

21. The method of claim 16, wherein the measured characteristic is within the predetermined range when a RxQual is less than 2.

22. The method of claim 16, wherein the measured characteristic is within the predetermined range when a bit error probability is greater than or equal to 25.

23. The method of claim 16, wherein the second channel comprises a different frequency than the first channel.

24. The method of claim 16, wherein the second channel comprises a different time slot than the first channel.

25. The method of claim 16, wherein the second channel comprises the same frequency as, but a different time slot than, the first channel.

26. The method of claim 14, further comprising:
receiving a second signal indicating an interference rejection capability of said receiving apparatus; and
further selecting the receiving apparatus depending on the second signal.

27. A transmitting apparatus for selecting a receiving apparatus for co-channel operation, comprising:
a processor;
memory in electronic communication with the processor;
instructions stored in the memory, the instructions being executable by the processor to:
provide a first and a second data;
transmit a first set of frames comprising a first frame with a first time interval during which a discovery burst is transmitted containing the first and second data at respective first and second power levels on a first channel comprising a single frequency and time slot;
receive a first signal transmitted by a receiving apparatus, the first signal indicating a measured characteristic of received data;
respond to the received first signal by selecting a receiving apparatus for co-channel operation depending on the measured characteristic; and
wherein the transmitter is configured to, depending on the measured characteristic, transmit a second set of frames that comprise a greater proportion of frames containing discovery bursts relative to the first frame.

28. The transmitting apparatus of claim 27, wherein the instructions are further executable by the processor:
to provide the first data so that the first data comprises the first predefined sequence of data, and provide the second data so that the second data comprises the second predefined sequence of data.

29. The transmitting apparatus of claim 27, wherein the instructions are further executable by the processor:
to transmit the first and second data on the first channel during a first time interval if the measured characteristic is within a predetermined range; and
to transmit the first data on the first channel and the second data on a second channel during a second time interval.

30. The transmitting apparatus of claim 29, wherein the instructions are further executable by the processor to determine the first and second time intervals depending on the measured characteristic.

31. The transmitting apparatus of claim 27, wherein the instructions are further executable by the processor to determine said first and said second power levels for transmission of said first and second data depending on the measured characteristic.

32. The transmitting apparatus of claim 27, wherein the instructions are further executable by the processor to treat the measured characteristic of received data as a measured characteristic of the first data.

33. The transmitting apparatus of claim 28, wherein the instructions are further executable by the processor to provide the first and second predefined sequences of data so that the sequences are training sequences.

34. The transmitting apparatus of claim 29, wherein the instructions are executable by the processor so that the measured characteristic is determined to be within the predetermined range when the measured characteristic is a RxQual and has a value of less than 2.

35. The transmitting apparatus of claim 29, wherein the instructions are further executable by the processor so that the measured characteristic is determined to be within the predetermined range when the measured characteristic is a bit error probability having a value greater than or equal to 25.

36. The transmitting apparatus of claim 29, wherein the instructions are further executable by the processor so that the second channel comprises a different frequency than the first channel.

37. The transmitting apparatus of claim 29, wherein the instructions are further executable by the processor so that the second channel comprises a different time slot than the first channel.

38. The transmitting apparatus of claim 29, wherein the instructions are further executable by the processor so that the second channel comprises the same frequency as, but a different timeslot than, the first channel.

39. A transmitting apparatus for selecting a receiving apparatus for co-channel operation, the apparatus comprising:
means for transmitting a first set of frames comprising a first frame with a first frame time interval during which a discovery burst is transmitted containing a first and a second data at predetermined first and second respective power levels on a single first channel comprising a single frequency and time slot;
means for receiving a first signal, wherein the first signal indicates a measured characteristic of received data; and
means for responding to the received first signal by selecting a receiving apparatus for co-channel operation depending on the measured characteristic; and
wherein the means for transmitting is configured to transmit to the selected receiving apparatus, depending on the measured characteristic, a second set of frames that comprise a greater proportion of frames containing discovery bursts relative to the first frame.

40. The transmitting apparatus of claim 39, wherein the means for transmitting is configured to transmit the first and second data so that the first data comprises a first predefined sequence of data; and the second data comprises a second predefined sequence of data.

41. The transmitting apparatus of claim 39, wherein the means for transmitting is configured:
to transmit the first and second data on the first channel during a first time interval if the measured characteristic is within a predetermined range; and
to transmit the first data on the first channel and the second data on a second channel during a second time interval.

42. The transmitting apparatus of claim 41 wherein the transmitting apparatus is configured to determine the first and second time intervals depending on the measured characteristic.

43. The transmitting apparatus of claim 39 wherein the transmitting apparatus is configured to determine said first and said second power levels depending on the measured characteristic.

44. The transmitting apparatus of claim 39 wherein the means for receiving the first signal is configured to treat the characteristic as a characteristic of the first data.

45. The transmitting apparatus of claim 40 wherein the means for transmitting is configured to use training sequences as the first and second predefined sequences.

46. The transmitting apparatus of claim 41 wherein the measured characteristic is within the predetermined range when the measured characteristic is a RxQual having value of less than 2.

47. The transmitting apparatus of claim 41, wherein the means for receiving the first signal is configured to treat the measured characteristic as being within the predetermined range when the measured characteristic is a bit error probability which has a value greater than or equal to 25.

48. The transmitting apparatus of claim 41, wherein the means for transmitting is configured to transmit the second data so that the second channel comprises a different frequency than the first channel.

49. The transmitting apparatus of claim 41, wherein the means for transmitting is configured to transmit the second data so that the second channel comprises a different time slot than the first channel.

50. The transmitting apparatus of claim 49, wherein the means for transmitting is configured to transmit the second data so that the second channel comprises the same frequency as, but a different time slot than, the first channel.

51. The transmitting apparatus of claim 39, further comprising a means for receiving a second signal, the second signal indicating an interference rejection capability of said receiving apparatus and wherein: the means for responding is configured to further select the receiving apparatus depending on the second signal.

52. A computer program product comprising:
computer-readable non-transitory media comprising:
code for causing a computer to select a receiving apparatus for co-channel operation, comprising instructions to:
provide a first and a second data;
transmit a first set of frames comprising a first frame with a first time interval during which a discovery burst is transmitted containing the first and second data at respective first and second power levels on a first channel comprising a single frequency and time slot;
receive a first signal transmitted by a receiving apparatus, the first signal indicating a measured characteristic of the data;
respond to the received first signal by selecting a receiving apparatus for co-channel operation depending on the measured characteristic; and
transmit, depending on the measured characteristic, a second set of frames that comprise a greater proportion of frames containing discovery bursts relative to the first frame.

53. The computer program product of claim 52 comprising instructions to:
provide the first and second data so that the first data comprises a first predefined sequence of data, and the second data comprises a second predefined sequence of data.

54. The computer program product of claim 52 comprising instructions to:
transmit the first and second data on the first channel during a first time interval if the measured characteristic is within a predetermined range; and
transmit the first data on the first channel and the second data on a second channel during a second time interval.

55. The computer program product of claim 52 comprising instructions to determine the first and second time intervals depending on the measured characteristic.

56. The computer program product of claim 52 comprising instructions to determine said first and said second power levels depending on the measured characteristic.

57. The computer program product of claim 52 comprising instructions to treat the first signal as indicating a measured characteristic of the first data.

58. The computer program product of claim 53 comprising instructions to transmit the first and second data so that the first data comprises a first predefined sequence and the second data comprises a second predefined sequence.

59. The computer program product of claim 54 comprising instructions to treat the measured characteristic as being within the predetermined range when the measured characteristic is RxQual and has a value less than 2.

60. The computer program product of claim 54 comprising instructions to treat the measured characteristic as being within the predetermined range when the measured characteristic is a bit error probability and has a value greater than or equal to 25.

61. The computer program product of claim 54 comprising instructions to transmit the second data so that the second channel comprises a different frequency than the first channel.

62. The computer program product of claim 54 comprising instructions to transmit the second data so that the second channel comprises a different time slot than the first channel.

63. The computer program product of claim 54 comprising instructions to transmit the second data so that the second channel comprises the same frequency as, but a different time slot than, the first channel.

64. The computer program product of claim 52 comprising instructions:
to receive a second signal indicating an interference rejection capability of said receiving apparatus; and
to further select the receiving apparatus depending on the signal.

* * * * *